(12) United States Patent
Han

(10) Patent No.: US 9,151,269 B2
(45) Date of Patent: Oct. 6, 2015

(54) RUN-OF-THE-RIVER OR OCEAN CURRENT TURBINE

(71) Applicant: Kyung Soo Han, Timonium, MD (US)

(72) Inventor: Kyung Soo Han, Timonium, MD (US)

(73) Assignee: Differential Dynamics Corporation, Owings Mills, MD (US)

( * ) Notice: Subject to any disclaimer, the term of this patent is extended or adjusted under 35 U.S.C. 154(b) by 0 days.

(21) Appl. No.: 14/255,377

(22) Filed: Apr. 17, 2014

(65) Prior Publication Data

US 2014/0241855 A1 Aug. 28, 2014

Related U.S. Application Data

(60) Continuation-in-part of application No. 13/915,785, filed on Jun. 12, 2013, now Pat. No. 8,702,552, which is a division of application No. 13/568,288, filed on Aug. 7, 2012, now Pat. No. 8,485,933, which is a (Continued)

(51) Int. Cl.
  *F03B 17/06* (2006.01)
  *F16H 29/04* (2006.01)
  *F16H 3/72* (2006.01)
  (Continued)

(52) U.S. Cl.
  CPC . *F03B 15/12* (2013.01); *F03B 3/18* (2013.01); *F03B 15/08* (2013.01); *F03B 17/06* (2013.01); *F05B 2260/40* (2013.01); *F05B 2260/402* (2013.01); *F05B 2260/42* (2013.01); *F16H 3/721* (2013.01); *F16H 29/04* (2013.01); *Y02E 10/223* (2013.01); *Y02E 10/226* (2013.01); *Y02E 10/28* (2013.01)

(58) Field of Classification Search
  CPC .... F03B 17/065; F03B 17/066; F03B 17/067; F16H 29/04; F16H 3/721
  See application file for complete search history.

(56) References Cited

U.S. PATENT DOCUMENTS 4,818,888 A * 4/1989 Lenoir, III ...................... 290/43
5,440,175 A 8/1995 Mayo, Jr.
(Continued)

FOREIGN PATENT DOCUMENTS

| CN | 102230444 | 11/2011 |
|---|---|---|
| EP | 2498076 A1 | 9/2012 |
| WO | WO92/14298 | 8/1992 |

OTHER PUBLICATIONS

PCT/US2014/035487, International Search Report and Written Opinion, mailed Aug. 12, 2014, received by facsimile on Nov. 10, 2014 from KIPO, 12 pages.

*Primary Examiner* — Tisha Lewis
(74) *Attorney, Agent, or Firm* — Cameron LLP

(57) ABSTRACT

A run-of-the-river or ocean current turbine may comprise a hatch and a slanted block having protector ribs for directing water flow to a waterwheel. The hatch may be controlled by a plurality of Transgear™ gear assemblies for varying the amount of water flow to the waterwheel from extreme drought to flood conditions so that the waterwheel may turn at rated speeds and within a predetermined range. The Transgear gear assemblies may comprise an accumulator for accumulating a rough and a fine tuned waterwheel speed. The Transgear assemblies may comprise embodiments of power take-off switches for, for example, bi-directional or clockwise and counterclockwise waterwheel shaft rotation. The turbine may be aligned for top-feed, side-feed or bottom feed of water and may comprise a tail wing or first and second turbines facing in opposite directions to capture high and low tidal flow.

24 Claims, 32 Drawing Sheets

Related U.S. Application Data continuation-in-part of application No. 13/425,501, filed on Mar. 21, 2012, now Pat. No. 8,641,570, which is a continuation-in-part of application No. 13/384,621, filed as application No. PCT/US2010/042519 on Jul. 20, 2010, now Pat. No. 8,388,481.

(60) Provisional application No. 61/226,943, filed on Jul. 20, 2009.

(51) Int. Cl.
*F03B 15/12* (2006.01)
*F03B 3/18* (2006.01)
*F03B 15/08* (2006.01)

(56) References Cited

U.S. PATENT DOCUMENTS

| | | |
|---|---|---|
| 7,081,689 B2 | 7/2006 | Tilscher et al. |
| 8,133,149 B2 | 3/2012 | Smithson et al. |
| 2005/0076730 A1* | 4/2005 | Han .................. 74/111 |
| 2009/0041584 A1 | 2/2009 | Gray et al. |
| 2010/0237626 A1 | 9/2010 | Hammer |
| 2010/0301609 A1* | 12/2010 | Kim et al. .............. 290/54 |
| 2012/0045336 A1 | 2/2012 | Martinez |
| 2012/0211990 A1 | 8/2012 | Davey et al. |
| 2012/0299301 A1 | 11/2012 | Han |
| 2013/0239566 A1 | 9/2013 | Kim et al. |

* cited by examiner

| Source | % Total | Tech | Fuel | Safety | Supply |
|---|---|---|---|---|---|
| Coal | 48 | Steam | Carbon-based | Emissions | Limited |
| Natural Gas | 18 | Steam | Carbon-based | Emissions | Limited |
| Petroleum | 1 | Steam | Carbon-based | Emissions | Limited |
| Nuclear | 22 | Steam | | Danger | Unlimited |
| Renewables | 11 | | | | Unlimited |

FIG. 1
PRIOR ART

| Renewables | % Total | % RE | Remark |
|---|---|---|---|
| Biomass Energy | 5.83 | 53 | Carbon-based, Emissions |
| Hydroelectric | 3.96 | 36 | Limited, Not increasing |
| Geothermal | 0.55 | 5 | Limited |
| Wind Energy | 0.55 | 5 | DOE mandated to increase the current 0.55% to 20% in 20 years |
| Solar Energy | 0.11 | 1 | Limited |

FIG. 2
PRIOR ART

| Infinitely Variable Transmission | Belt & Pulley CVT | Toroidal IVT Torotrak | Ball & Disc IVT Fallbrook | Ratcheting IVT D2Motion |
|---|---|---|---|---|
| | 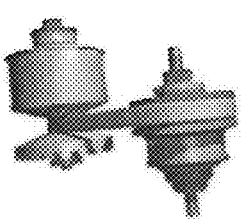 | 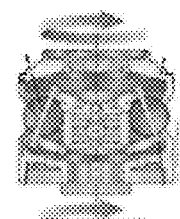 | 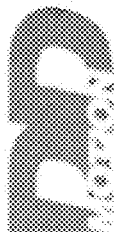 | 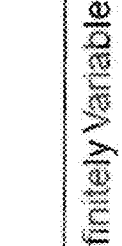 |
| Output | Infinitely Variable | Infinitely Variable | Infinitely Variable | Infinitely Variable |
| Scalability | Friction Drive Not Scalable | Traction Drive Not Scalable | Traction Drive Not Scalable | Gear Drive Scalable |
FIG. 5

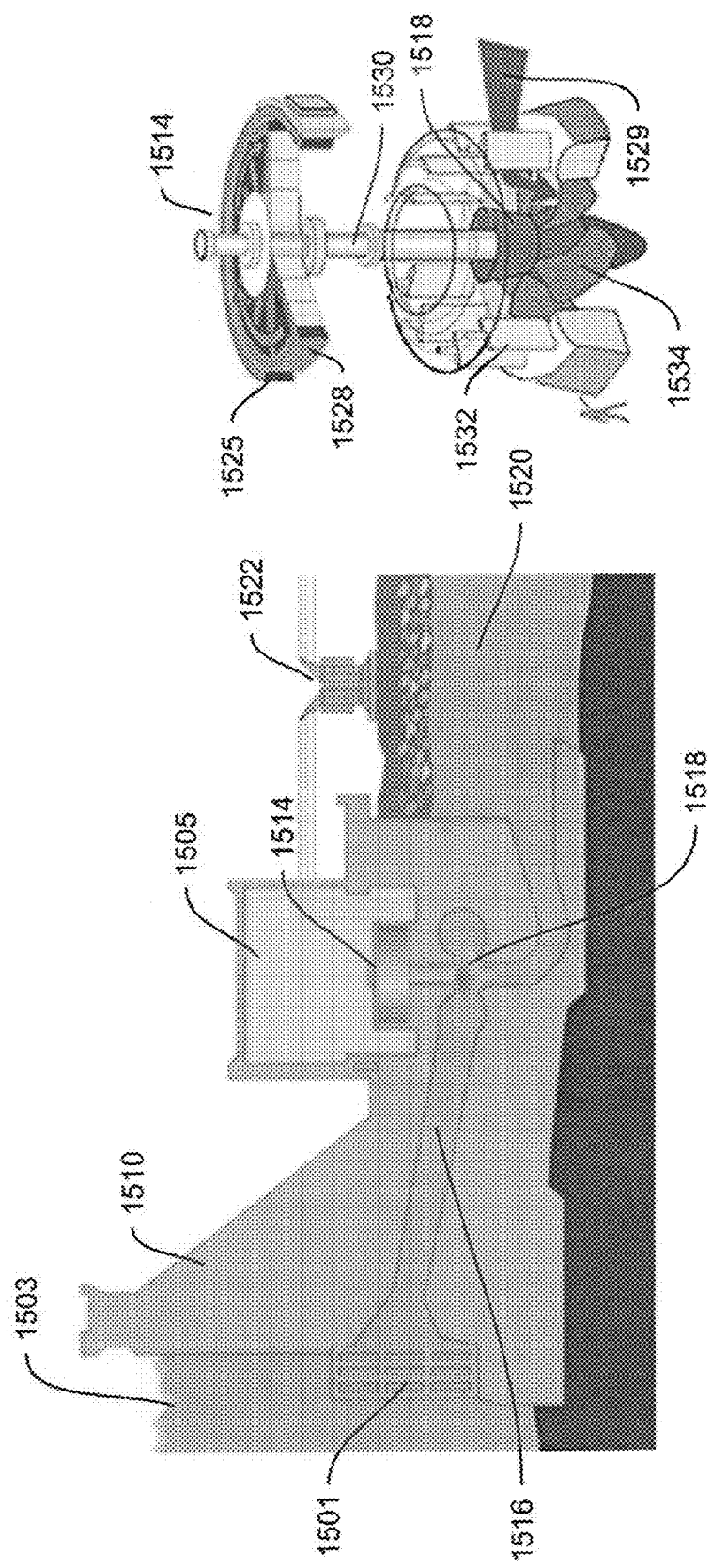

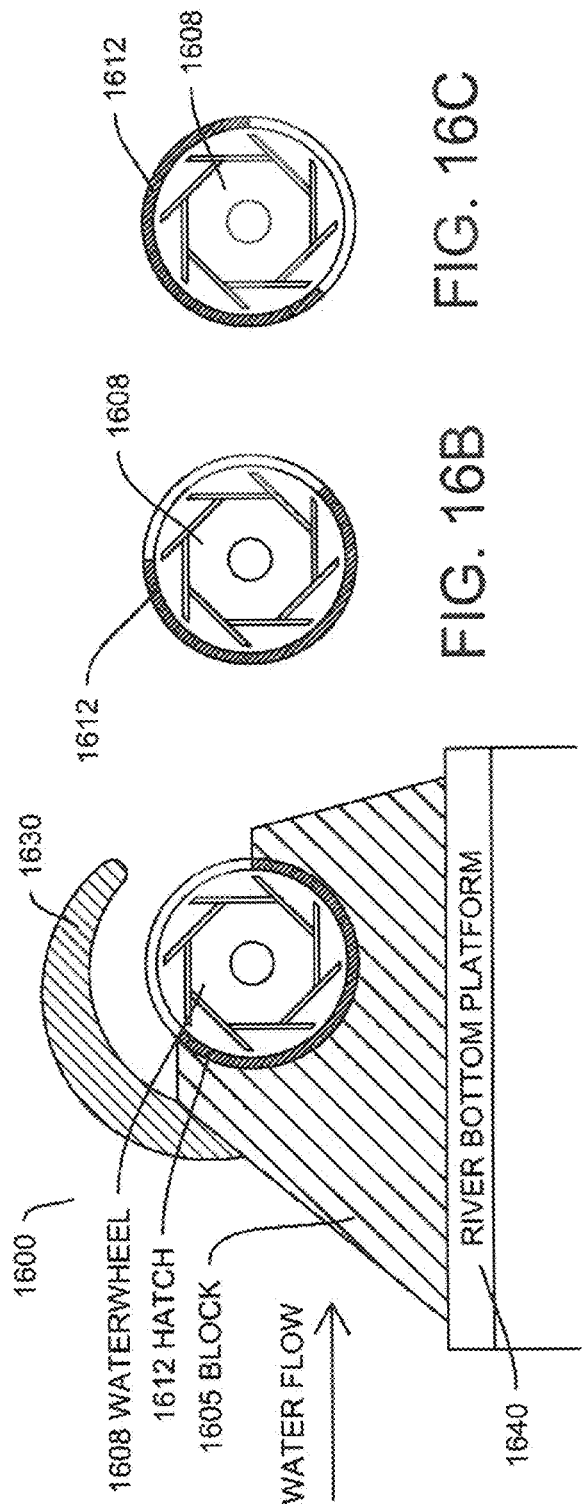
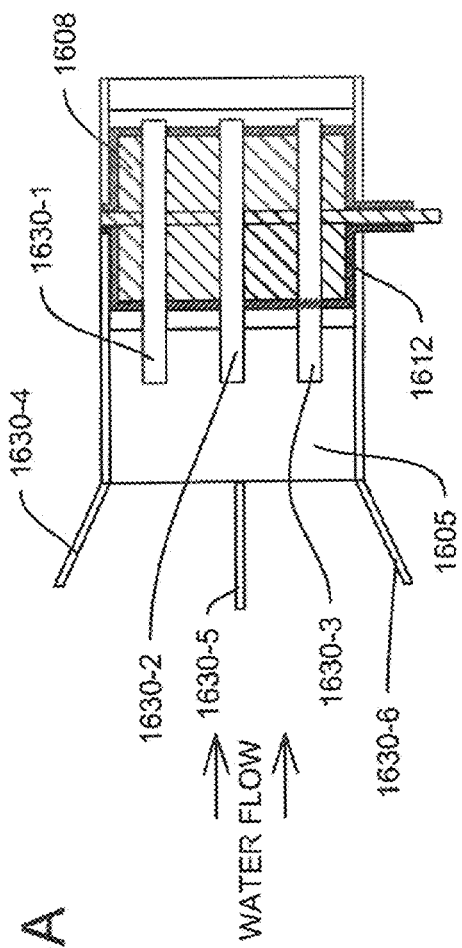

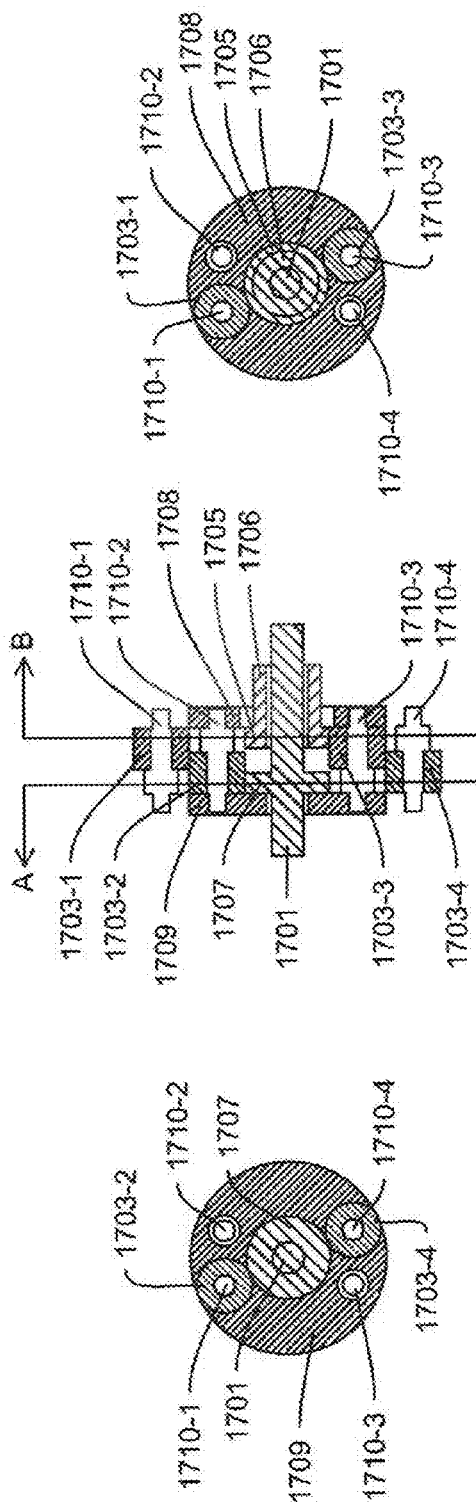
FIG. 17B
FIG. 17A
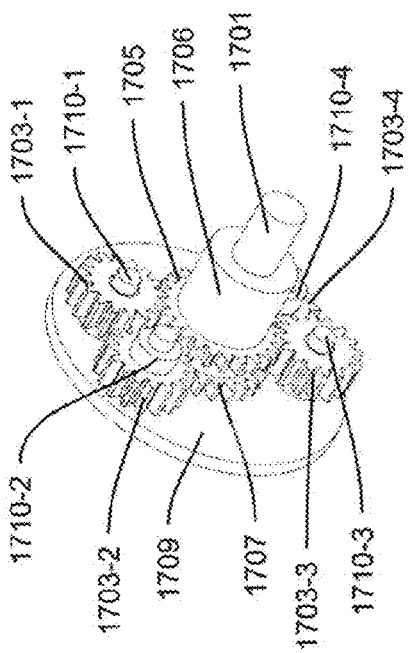
FIG. 17C
FIG. 17D

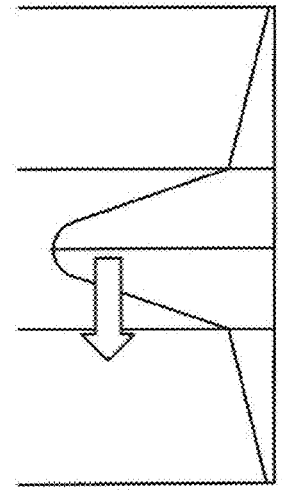
FIG. 27A
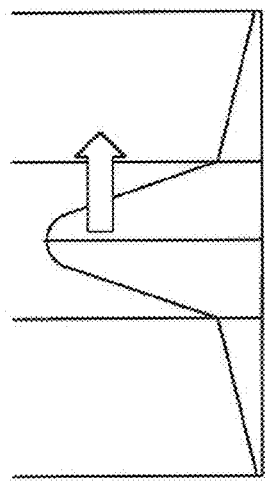
FIG. 27B
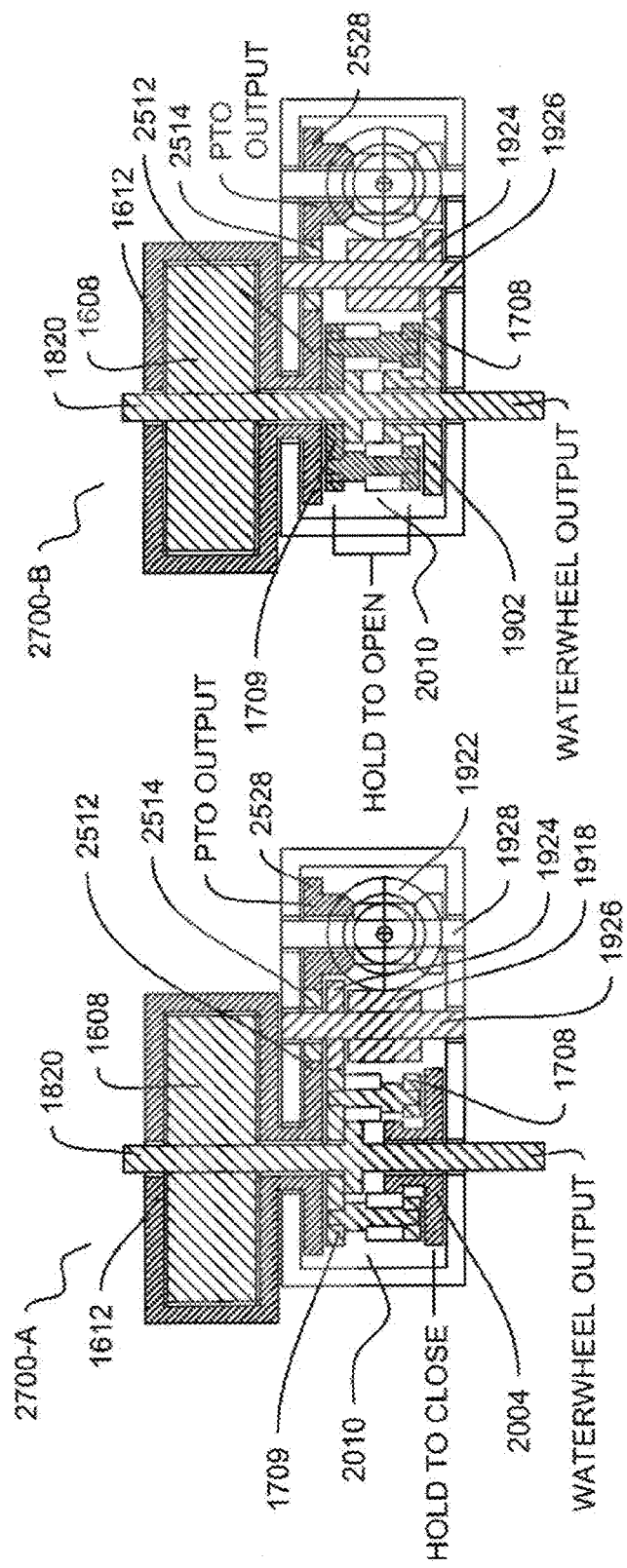
FIG. 27C
FIG. 27D

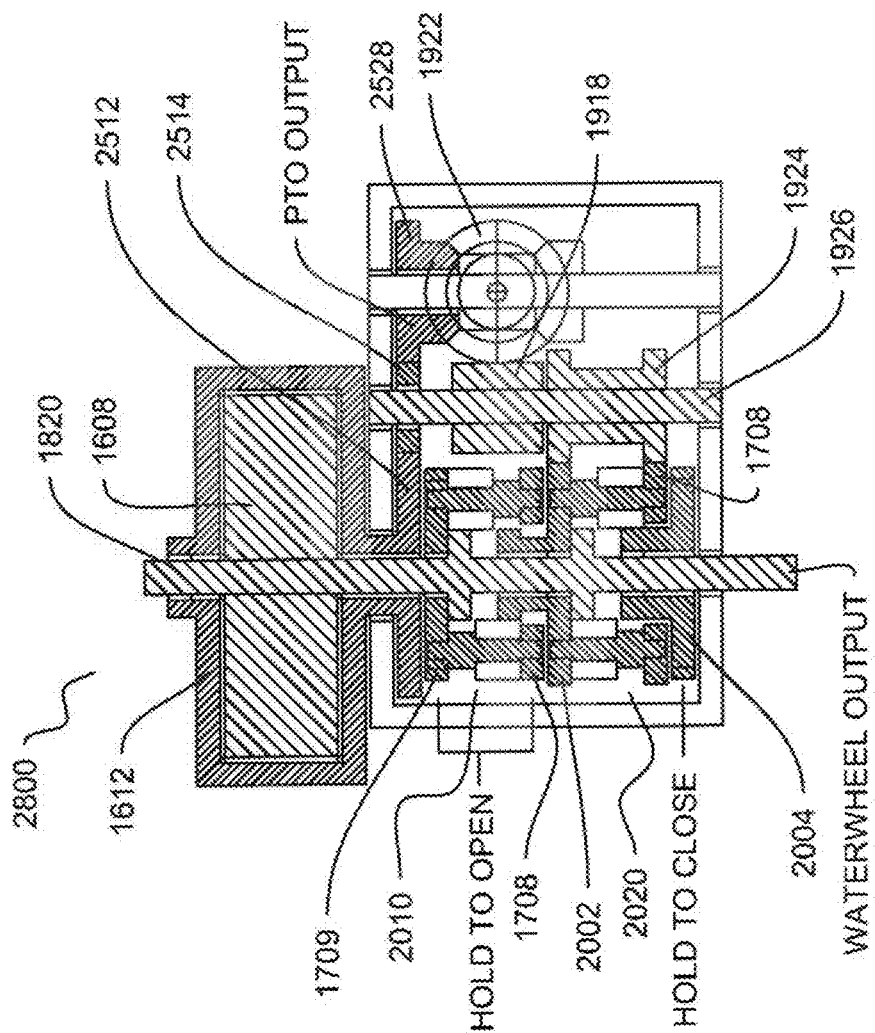
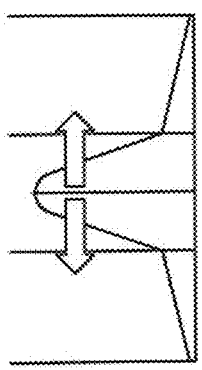
FIG. 28A
FIG. 28B

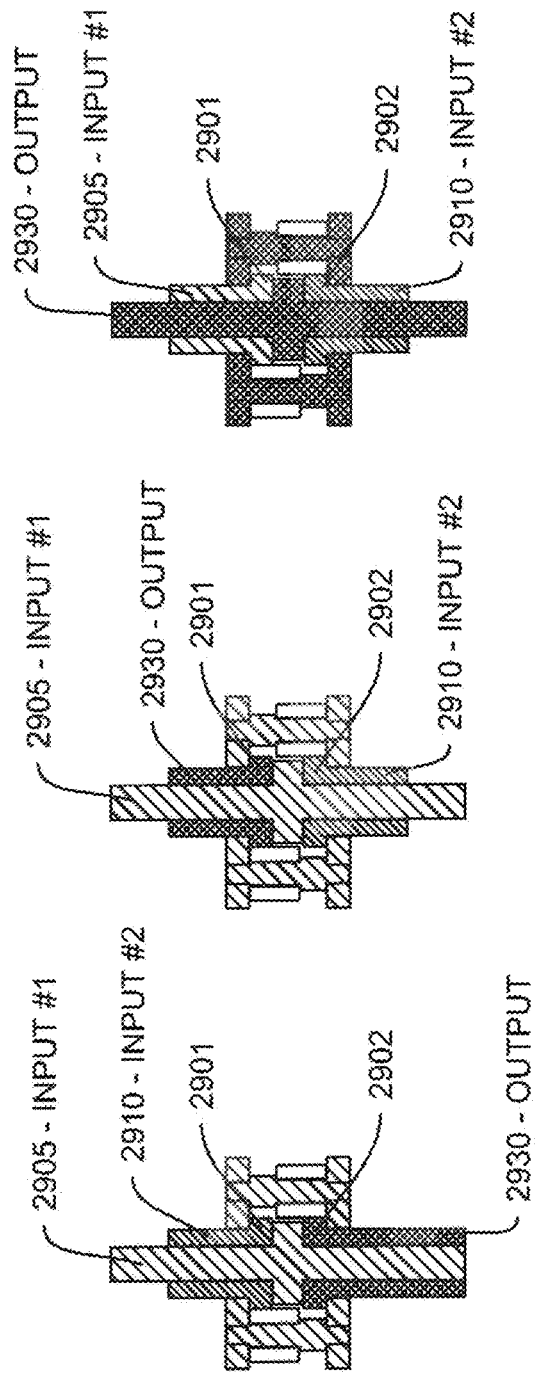

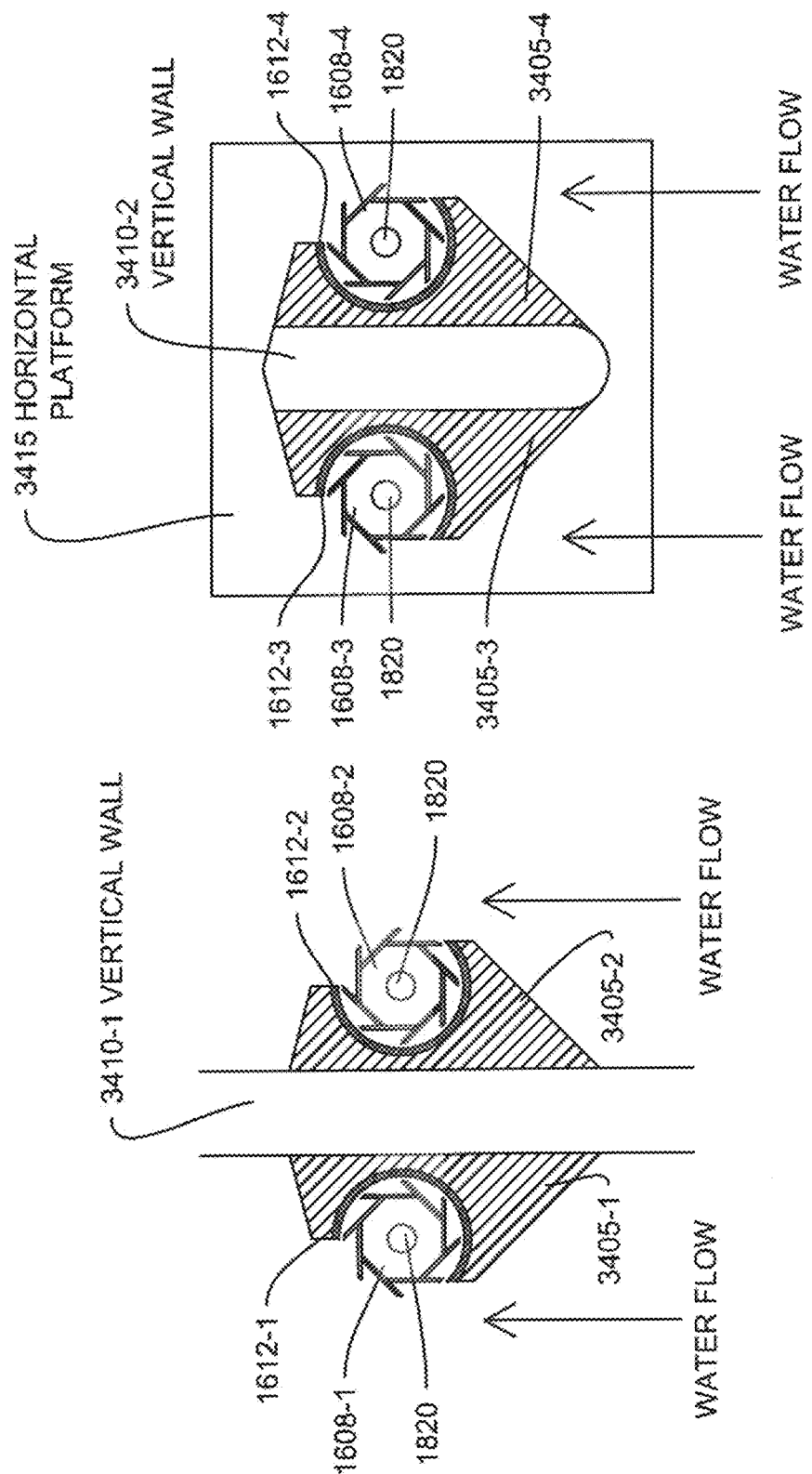

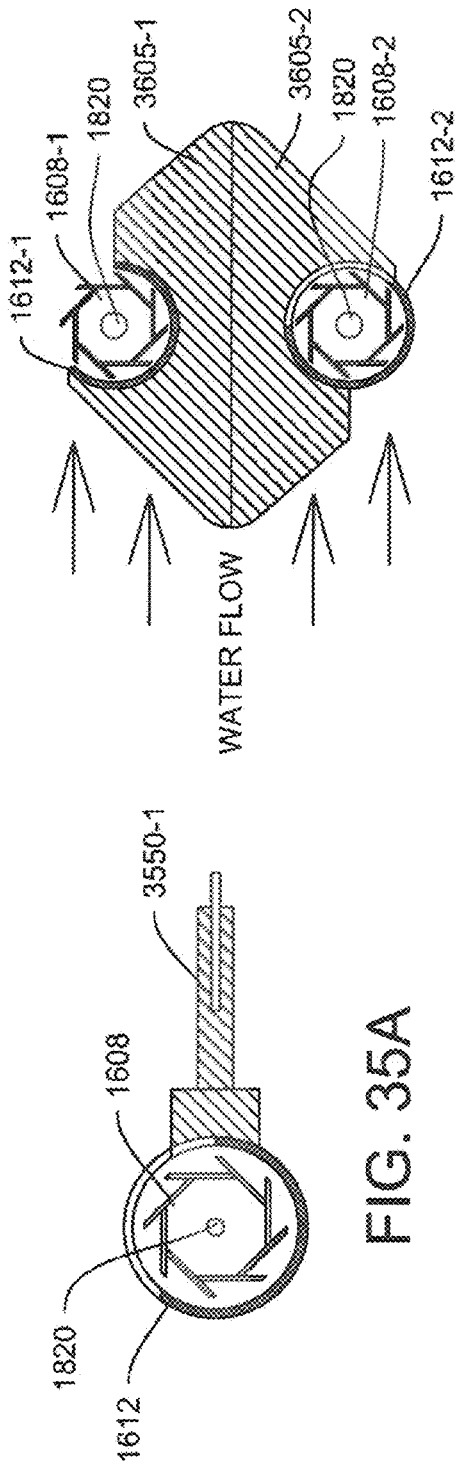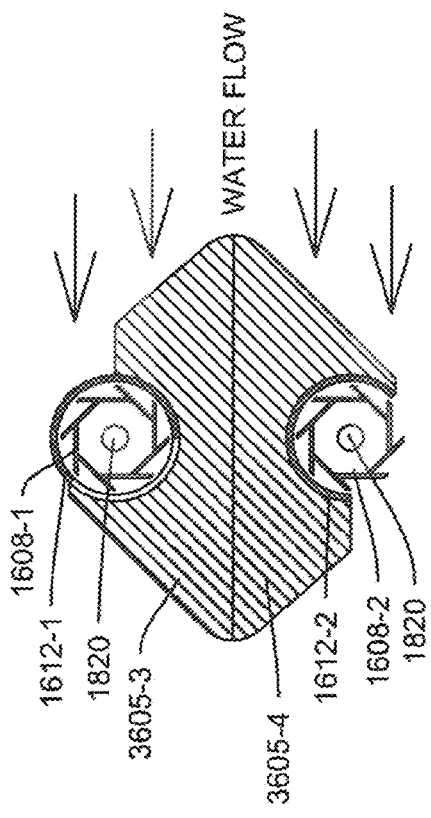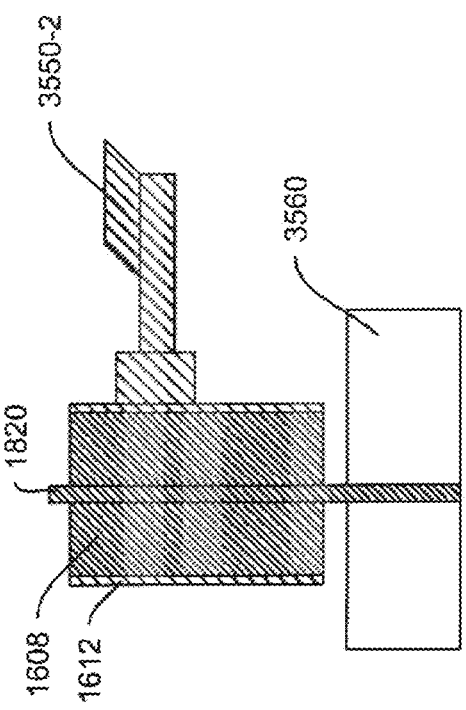

RUN-OF-THE-RIVER OR OCEAN CURRENT TURBINE

This application claims the benefit of priority and is a continuation-in-part of U.S. patent application Ser. No. 13/915,785 filed Jun. 12, 2013 entitled "Infinitely Variable Motion Control (IVMC) for a Transmission with a Differential" which is a division of U.S. patent application Ser. No. 13/568,288 filed Aug. 7, 2012, now U.S. Pat. No. 8,485,933 entitled "Infinitely Variable Motion Control (IVMC) for River Turbines" which is a continuation-in-part of U.S. patent application Ser. No. 13/425,501, filed Mar. 21, 2012, now U.S. Pat. No. 8,641,570 entitled "Infinitely Variable Motion Control (IVMC) for Generators, Transmissions and Pumps/Compressors" which is a continuation-in-part of U.S. patent application Ser. No. 13/384,621, filed Jan. 18, 2012, now U.S. Pat. No. 8,388,481 entitled "System and Method for Providing a Constant Output from a Variable Flow Input" which is a national stage entry of PCT/US2010/042519 filed Jul. 10, 2010 which claims the benefit of priority to U.S. Provisional Patent Application Ser. No. 61/226,943 filed Jul. 20, 2009, all of Kyung Soo Han, the contents of each of which are incorporated by reference as to their entire contents.

TECHNICAL FIELD

The technical field of the invention relates to providing an efficient run-of-the-river or ocean current turbine having a mechanical speed converter which converts variable rotational speed to constant and being useful for generating alternating current electrical energy and, more particularly, to a turbine for efficiently collecting (harnessing) hydrokinetic energy (water energy) using a hatch which is controlled by Transgear™ gear assemblies as controls and power take-off (PTO) switches, for example, such as a spur gear Transgear assembly having an input, an output, and a control.

BACKGROUND

Hydroelectric energy is one source of so-called renewable energy. Referring to FIG. 1, about 48% or almost half of all electric energy is produced by steam generation using coal. Natural gas provides about 18% of U.S. electric energy, and nuclear energy now provides about 22% via steam generation. Petroleum, such as oil, is used to produce only about 1% of U.S. electric energy. Coal, natural gas and petroleum are carbon-based and when burned produce emissions which can be costly to mitigate or, if not mitigated, can be dangerous or at least increase the so-called carbon footprint in the earth's atmosphere. The supply of coal, gas and petroleum is also limited. Nuclear energy generation, unless handled with extreme care, is dangerous, and the spent nuclear fuel becomes a hazard to the world.

Consequently, the hope of electrical energy generation for the future is in so-called renewables which include, but are not limited to, the air (wind power), the sun (solar power) and water (hydroelectric) sources. The great Hoover dam and the Tennessee Valley Authority are exemplary of projects started in the early 20$^{th}$ century in the United States. Large hydroelectric turbines in such dams on rivers in the United States are now being replaced with more efficient and larger capacity turbines. But the number and utility of dam-based hydroelectric power is limited, and the dams shut down commercial river traffic on navigable rivers. The dam backs up a river to form a lake which can take away valuable land resources that could be used to grow food or permit animals to feed. On the other hand, the created lakes provide water control and recreational use for boating, fishing and the like. Nevertheless, there remains a need for a device that may save the cost of building a dam, permit the hydroelectric generation of electricity and use the inherent flow of a river or the flow of ocean currents, tides and waves.

Referring to FIG. 2, it may be seen that so-called biomass energy generated from plant and animal material (waste), while it amounts to 5.83% of total renewable energy, has similar problems to those of non-renewable carbon-based systems and can cause emissions. While hydro-electric energy amounts to the next greatest renewable source at 3.96%, it is believed that more can be done to efficiently utilize the rivers, tides and ocean currents in the United States and near its shores than by hindering the flow of water commerce by the construction of dams.

Other renewable sources include geothermal, wind and solar energy. While these are "clean" sources, to date, their growth has been unimpressive. Only wind energy is supported by the Department of Energy to grow from 0.55 to 20% of all US energy in approximately 20 years.

Referring to FIG. 3, there is shown a currently used conventional wind turbine 300. Further detail of a conventional turbine is described in WO 1992/14298 published Aug. 20, 1992 and assigned to U.S. Windpower, Inc. A variable speed rotor 305 may turn a gearbox 312 (upper black and white drawing) to increase the rotational velocity output of the rotor and blade assembly 305, 307, 309. For example, a so-called cut-in speed (rotational velocity) of a rotor 305 may be about six revolutions per minute and the rotor blade may typically cut-out at about 30 revolutions per minute by controlling the pitch of the rotor 305 via a pitch control system 307 during conditions of high wind velocity and to reduce rotor blade noise. Typically, wind speeds over 3 meters/sec are required to cause the large rotor blades to turn at the cut-in speed (rotational velocity). Wind frequency between cut-in and cut-out speeds (velocities) has been measured to vary depending on location, weather patterns and the like. Placement high on a hill or a mountain of a wind turbine, for example, may be preferable to locating the wind turbine at a low point in a valley. Consequently, it may be recognized that there are periods of time when wind turbines 300 do not have sufficient wind speed to operate at all depending on weather conditions, placement and the like.

When wind speed reaches an excess amount, a pitch (and yaw) control system 307 may measure the wind speed and adjust the pitch of rotor blades 305 to pass more wind and so control the rotor blade from turning too fast as well as point the rotor blade into the wind. Yaw control may supplement pitch control to assist in pointing a rotor into the direction of flow. Noise from rapid rotor velocity can be abated, for example, by turning the blade parallel to the wind using a wind speed control system to thus maintain the rotational velocity close to a cut-out speed. An anemometer 380 at the tail of the turbine 300 may measure wind velocity and provides a control input. The tail of the turbine may be equipped with a rudder or wind vane for pitch or yaw control. Horizontal or vertical stabilizers (not shown) may be provided for pitch or yaw control. The rudder or wind vane may help point the variable speed rotor 305 into the wind. In general, however, there is a problem with known wind turbine systems that only a portion of the wind energy available at a site of a wind turbine farm may be harnessed resulting in harnessing only a portion of the kinetic energy of the available wind to feed a power grid.

Referring again to FIG. 3, the gearbox 312 may multiply the cut-in speed (rotor output) of six RPM, for example, by fifty yielding 300 RPM (more or less) for turning a variable speed generator 314 (upper black and white line drawing). A variable speed generator 314 may be used to convert the varying rotational speed of a main shaft 309 (upper black and white line drawing) to a variable frequency alternating current 322 for input to a power converter called a variable frequency converter 320 (VFC 320). In so doing, the variable frequency alternating current power 322 may be converted to direct current 324 and then to irregularly switched alternating current power 326 at a useful frequency such as 60 Hz. The conversion from variable frequency to direct current to constant frequency introduces inefficiency in converting kinetic energy (flow energy) to useable electric energy and so reduces an amount of power that may be output to grid 330.

VFC 320 converts variable frequency alternating current 322 produced by variable speed generator 314 to direct current DC 324, to irregular switched alternating current 326. The irregular switched alternating power 326 is acceptable for outputting to grid 330 of constant power alternating current at constant frequency 328 but is inefficiently produced. The VFC (power converter) 320 frequently fails. The cost to replace known variable frequency converters (power converters) 320 is, for example, between $50,000 and $100,000 and, consequently, an alternative design has been sought for the conventional wind turbine 300 as will be further discussed herein with reference to FIGS. 4 and 5.

A gearbox 312 is known to have a failure rate of approximately 5%. Electronics used in a wind turbine 300 has the highest potential failure rate of 26%. Control units generally exhibit a failure rate of 11%. Sensors and yaw control exhibit approximately a 10% failure rate. The failure rate of VFC 320 may be on the order of 26% (electronics) according to an ongoing consortium's study of drive train dynamics at the University of Strathclyde, Glasgow, Scotland. The mean time between failures may be only two years on average; and the replacement cost may be over $50,000 (US) per converter. A failure rate of the generator 314 is on the order of 4.5%. Consequently, problems related to known wind turbines relate closely to the failure rate of gearboxes, generators, variable frequency converters and associated electronics and inefficiencies of operation.

A solution to the identified problems is to provide a constant rotational velocity as an input to the constant speed electric generator so that the generator in turn can produce a constant frequency output and deliver the power directly to grid 330. Transmissions have been developed or are under development by the following entities: IQWind, Fallbrook and Voith Wind (Voith Turbo) to provide a constant output from a variable input. U.S. Pat. No. 7,081,689, (the '689 patent) assigned to Voith Turbo of Germany is exemplary of an overall system control design providing three levels of generator control. Voith provides a so-called power split gear and a hydrodynamic Fottinger speed converter or transformer adapted to be connected between a rotor and gear assembly and a synchronous generator for outputting power to a grid, for example, at 50 Hz (European).

Many of the problems of wind turbines are carried forward into run-of-the-river and tidal turbines. There is the same problem of having to convert a variable frequency input to a constant frequency output. On the other hand, the density (mass) of water is much greater and its speed is not as variable as wind speed. Generally, rivers flow in one direction and the major ocean currents do the same. Wave generation, however, in oceans and other large bodies of water varies with wind and weather. Ocean shore waves are more predictable and a strong undertow can be useful for electric power generation.

Referring now to FIG. 4, there is shown a concept for improving wind turbines by use of a mechanical direct drive 400 in which rotor designated 405 and shaft 409 drive generator 414. A direct drive may be used to directly drive an electric generator without using a gearbox, i.e. directly driving the generator. The failure and efficiency problems of gearboxes may be eliminated by eliminating the gearbox with direct drive. One may increase the number of poles by fifty times, use power converters 320 and so result in reduced down time for repairs at the expense of increased cost due to the direct drive assembly 400. A speed converter to convert variable speed to constant speed is disclosed in U.S. Pat. No. 8,388,481 which is entirely mechanical and so improves upon the high failure rate, reliability and efficiency of known electrical/mechanical systems. Speed converters under development are shown in FIG. 5 which may be described as infinitely variable speed converters.

Referring to FIG. 5, a belt and pulley driven continuously variable transmission (CVT) is known but is dependent on friction drive and is not scalable. Traction drive infinitely variable transmissions are known produced by Torotrak and Fallbrook. The Fallbrook device may be described by U.S. Pat. No. 8,133,149. A 2004 report, NREL/TP-500-36371, concluded that the Fallbrook device is not scalable. Further speed converters are described by FIGS. 10 and 11 of U.S. Pat. No. 8,641,570 of Differential Dynamics Corp. (also known as DDMotion). The DDMotion speed converters are differentiated from those of Torotrak and Fallbrook by their gear drives (no pulleys or belts) and that they are scalable. Now, known river and ocean devices will be discussed with reference to FIGS. 6 to 11.

PRIOR ART FIG. 6 shows a line drawing of a turbine produced by Hydrovolts, Inc. The depicted apparatus 600 appears to comprise a waterwheel 610 and may comprise a gear and belt drive (inside the box, not shown) which may, because of the belt, be susceptible to slippage. At their web site, a 15 kW waterfall turbine is described for use at a waterfall such as at spillways or outflows in industrial plants. Hydrovolts also produces a 12 kW zero-head canal turbine that allegedly can capture the energy in moving water. Reference may be made to U.S. Published Patent Application 2010/0237626 of Hammer published Sep. 23, 2010, which appears to comprise a waterwheel construction. Hydrovolts' rotating (hinged) blades may control some of the water flow speed, but it is urged that the rotating blades may be susceptible to damage.

Referring now to FIG. 7, there is provided a mechanical perspective view of a river turbine 700 attributed to Free Flow Power Corp. and may have been lowered to the bottom of the Mississippi River or attached to a piling. It is believed that the device 700 comprises a device 720 very similar to a turbine engine of an airplane but below water level and the water, at velocity, drives a turbine propeller 710. Due to lowering prices of natural gas, the project became economically unviable (according to their press release in 2012).

It is generally known in the art to utilize devices that look much like wind turbines to capture water energy. Referring to FIG. 8, there is shown a mechanical diagram of a tidal and/or river current turbine taken from FIG. 1 of U.S. Pub. Patent App. 2009/0041584. The diagram provides the labels, showing direction of water flow "A" (from right to left). Note that the turbine rotates on a pole so that rotor blade 150 captures the water as it passes. This device is available from Verdant Power and may be further described by U.S. Published Patent Application 2009/0041584 of Feb. 12, 2009. It is respectfully submitted that Verdant Power may currently be strengthening their blades and adding pitch control.

Referring to FIG. 9, there is shown a mechanical front view of a rotating ring device 900 including rotating ring 910 available from Oceana Energy Company. This turbine drawing taken from FIG. 1 of U.S. Published Patent Application 2012/0211990 allegedly comprises hydrofoils both external and internal to the rotating ring. The device may be further described by Oceana Energy's U.S. Published Patent Application 2012/0211990 of Aug. 23, 2012.

Perhaps the most like a wind turbine in appearance is the tidal energy turbine 1000 of ScottishPower Renewables, a division of Iberdrola. According to press releases, this tidal device 1000 with its propeller (rotor blades) 1010 is capable of generating approximately 10 MW of power as an "array" perhaps of twelve or more such devices at less than 1 MW each.

Devices are also known for harnessing the power in water waves such as ocean waves. Such a device is known and available from Pelamis Wave Power. Referring to FIG. 11A taken from FIG. 1 of Pelamis's U.S. Pub. Patent Application 2013/0239566, a Pelamis device 10 floats in the ocean, the device 10 may comprise a plurality of hinged sections 12-A, 12-B, 12-C, 12-D and 12E. Referring to FIGS. 11B and 11C, there is shown the direction of a wave from left to right. As the wave passes through the hinged sections, the sections 12A through 12E move up and down with the height of the wave. The wave thus creates movement which may be used to generate electricity. It may be said that the higher the wave, the greater the movement; the calmer the seas, the less the movement. Further details are provided in U.S. Published Patent Appl. No. 2013/0239566 of Sep. 19, 2013.

Referring now to FIG. 12, there is a map of the United States showing the major rivers which include the Ohio, the Mississippi, the Missouri, the Snake River and the Pecos and Brazos Rivers of Texas. As can be seen from the map, there is a great potential to harness the water energy of these rivers in the United States and to power, for example, the entire area covered by the Mississippi River and its tributaries including the Missouri, the Platte and the Red Rivers. Using dams would be costly. It may be that only Free Flow Power (FIG. 7) has developed a device for use on such a river as the Mississippi (but Free Flow Power abandoned the Mississippi project in 2012).

Referring to FIG. 13, there is shown a map of the world showing the major rivers of the world, further highlighting the potential to harness water energy in rivers world-wide. Finally, referring to FIG. 14, there is shown a map of the oceans showing major ocean currents. Proximate to the United States, there is the strong ocean current of the gulf stream current 1401 which is known to flow northward along the east coast of the United States. On the west coast of the United States, there is known a southward current 1402 initiating as the north Pacific drift and as it passes California is referred to as the California Coastal current. Other important currents include and are not limited to the Peru/East Australian current 1403, the Brazilian current/Benguela current 1404, the west wind drift 1405, the West Australian current 1406, the Kuroshio current 1407 and the North Atlantic drift 1408. These strong currents are known and have the potential to generate a considerable amount of power but are presently not used for electricity generation but, presently, are not believed to be used for power generation. (Also, predictable ocean tides cause water to flow upstream in ocean tributaries at high tide and downstream in ocean tributaries at low tide and may be more widely used for electric power generation.)

Referring to PRIOR ART FIG. 15A and FIG. 15B, there is shown a diagram of a typical hydroelectric power plant. A first step in harnessing water energy in this means is to build a dam 1510 to create a pressure head that is proportional to the depth of the water backed up by the dam. The backed-up water is represented by reservoir 1503. At the base of the dam 1510, there may be intake gates 1501 which allow water that has been compressed by the head to flow through a penstock 1516 to powerhouse 1505 which is one of many such powerhouses 1505 that may be constructed along the width of a large dam. One powerhouse 1505 may comprise a generator 1514 and a turbine 1518 which outputs power to long distance power lines 1522. Once the water passes through the turbine, it is returned to the river 1520. Details of the generator and turbine are shown in FIG. 15B. A generator 1514 may comprise a stator 1525, a rotor 1528 where the rotor is turned by a turbine generator shaft 1530. The generator 1514 creates electric power at grid frequency which then feeds power grid 1522. The turbine 1518 may comprise a wicket gate 1532 for controlling the amount of water flow 1529 to the turbine 1518. The wicket gate 1532 allows water to flow through turbine rotor blades 1534 and then pass on downstream to the river 1520 that has been dammed.

Referring to FIG. 16A through FIG. 16D, a run-of-the-river turbine is shown which first appears in U.S. Pat. No. 8,485,933, FIGS. 11 and 12. Protector ribs 1111 (FIG. 11) have been moved from the input as shown in FIGS. 11(B) and 12(B) to protect the waterwheel 1608 as seen as protector ribs 1630 in present FIG. 16A and FIG. 16D extending from block 1605 to partially cover the waterwheel 1608. Protector ribs 1111 of FIG. 11(B) and protector ribs 1630-4, 1630-5 and 1630-6, newly shown in FIG. 16D may serve two purposes, to protect the water input to the waterwheel 1608 from large debris and to channel the water toward the waterwheel 1608. In FIG. 16A through FIG. 16D, water flow is seen approaching from the left and flows over a block 1605 via a ramp portion analogous to a penstock and then over the flat surfaced top of block 1605 to a hatch 1612 which may be spring-loaded (spring not shown) or sensor controlled and so self-regulating from a fully open position shown in FIG. 16A to a partially closed position shown in FIG. 16B to a fully closed position shown in FIG. 16C depending on the volume and speed of the water, the direction of water flow and the spring constant of a spring (not shown). For example, during flood conditions, the turbine of FIG. 16C may have its hatch 1612 fully closed. The spring constant may be selected to match the specific characteristics of a hatch lip, not shown, for catching water as it flows toward the rotor blades of the waterwheel 1608. FIG. 16D shows top views of protector ribs 1630-1 to 1630-6 and water guides or venturis 1630-4 and 1630-6 channeling the water to the base of the block 1605, the water flowing over the block 1605 and to the waterwheel 1608 protected by protector ribs 1630-1 to 1630-3 for generating power. In the present specification, all depicted embodiments of the present invention are not drawn to scale and are intended to depict concepts that may be utilized and sized differently in different applications such as shallow, fast rivers; deep, long rivers, ocean currents, tidal estuaries and the like. The number and location of protector ribs 1630 are exemplary only and not intended to be limiting. Also, the first number or numbers of a reference numeral denote where that identified component first appears. So, for example, block 1605 will be consistently labeled as such in the drawings with numbers which follow after FIG. 16A through FIG. 16D.

All of the above-identified patents and published applications are incorporated by reference herein as to their entire contents.

Even with the above-described improvements to wind, river and ocean turbine devices known from the above identified entities, patent applications and patents, there still remains a need in the art to provide further enhancements and improvements to, for example, scalability, efficiency, reliability and increased electrical power generation by means of further embodiments of turbines and generators for run-of-the-river and for ocean currents and tides.

SUMMARY OF THE SEVERAL EMBODIMENTS

This summary is provided to introduce a selection of concepts. These concepts are further described below in the Detailed Description. This summary is not intended to identify key features or essential features of the claimed subject matter, nor is this summary intended as an aid in determining the scope of the claimed subject matter. These concepts relate to embodiments of a run-of-the-river turbine and/or an ocean current turbine with a constant speed generator and the utilization of embodiments of power take-off assemblies and switches which efficiently utilize Transgear assemblies and other assemblies to control power generation, for example, in the event of variable water flow in terms of volume and direction of flow as will be further described herein.

Referring briefly to FIG. 16A to FIG. 16D, there are shown some basic concepts of a DDMotion run-of-the-river turbine that may be also used for ocean current flow. There are shown a river bottom platform 1640 that may raise the turbine assembly above mud or other river (or ocean) bottom debris. Mounted thereon, may be an assembly comprising a block 1605 for causing the flow or river water entering from the left to be accelerated and pressured with water flowing at hatch 1612 level so that the block 1605 has a penstock function of delivering and causing increased pressure and flow at the level of a hatch assembly 1612 shown in FIG. 16A as fully open. The block 1605 permits the water flow to be caught directly by rotor blades of a waterwheel 1608 as the water flows over the flat top of the block 1605. Note that the rotor blades may be, in one position, directly horizontal to and in the same plane with the horizontal flat top portion of the block 1605 directly to the left of the waterwheel 1608. (To explain the concept clearly, the rotor blades of waterwheel 1608 are drawn straight and the number of blades may be fixed at eight but the blade shape and the number of blades will be optimized depending on the given conditions.) The waterwheel hatch 1612 is in a normally fully open position but may be actuated by a small lip (not shown) at the left of the hatch 1612 and a spring assembly (not shown) or a sensor and servo-motor (not shown) attached to the hatch 1612 to measure and move with increased water pressure to a partially closed position seen in FIG. 16B. The size of the lip and the spring constant of the spring may be specifically chosen to match the expected normal water flow velocity over the block 1605 as the water flows to the waterwheel 1608. If these run-of-the-river turbine embodiments 1600 of FIG. 16A through FIG. 16D are placed out of the flow of water traffic but frequently in series along the entire length of a strong river such as the Mississippi River, it is urged that the entire population along the banks of the Mississippi River may be supplied with power by such a series of run-of-the-river turbines 1600. Now, a basic spur gear Transgear assembly will be discussed with reference to FIG. 17A through FIG. 17D.

Referring to FIG. 17A through FIG. 17D, a basic spur gear Transgear assembly is shown, first appearing as FIG. 4B of U.S. Pat. No. 8,388,481; FIG. 1 of U.S. Pat. No. 8,485,933; and FIG. 3 of U.S. Pat. No. 8,641,570. According to the present invention, the spur gear Transgear assembly may comprise a simple push switch or power take-off (PTO) for the waterwheel of FIG. 16A. Moreover, a worm and a worm gear assembly may serve as a power take-off control and be in a normally locked position with a spur gear Transgear clutch assembly first shown in FIG. 2(A) of U.S. Pat. No. 8,485,933.

When first and second spur gear Transgear assemblies are utilized side-by-side with a common shaft and direction control, such an embodiment may be used with a first spur gear Transgear assembly as a hold for power take-off output, clockwise rotational waterwheel direction and a second spur gear Transgear assembly may be used as a hold for a power take-off output, counter-clockwise rotational direction. The two spur gear assemblies thus may form a bi-directional power take-off switch.

In yet a further embodiment of the present invention, the bi-directional power take-off switch may be enhanced by a worm and a worm gear assembly for connection to the clockwise spur gear Transgear assembly where the power take-off output is normally located.

Multiple sets of bi-directional switches are feasible for controlling multiple directions of water flow input. For example, two or more sets of bi-directional spur gear Transgear assemblies with a worm and a worm gear assembly control of clockwise rotational direction may be used for such multiple directions of water flow input to a waterwheel.

Besides hatch lip and spring control of the hatch, a sensor may be used to measure flow rate and/or rotor RPM or generator RPM and via a servo-motor, power supply (battery backup) or use of generated electric power tapped from an electric generator control the hatch to increase or decrease the amount of water flowing to the waterwheel by controlling the degree of hatch opening and closing. The hatch itself may be controlled by spur gear Transgear assemblies powered by the waterwheel similarly, for example, in the same manner as tractor PTOs are powered by a tractor's engine in combination with a disc where the spur gear Transgear assembly is connected to a worm and a worm gear assembly as will be further discussed herein.

Generally, a spur gear Transgear assembly in combination with a worm and a worm gear assembly may be used to lock control feedback or overflow and make the wheel rpm as constant as possible thus producing a constant electrical frequency which may be output as a constant frequency.

In further embodiments, a spur gear Transgear assembly may be used as an accumulator of multiple waterwheel inputs. Three embodiments of a Transgear assembly as an accumulator will be discussed herein. There may also be assemblies added for rough control of a hatch and fine tuning of the hatch controlled waterwheel (shaft) rpm as well as using a spur gear Transgear assembly to accumulate the rough tuned and fine tuned inputs for an output to a known gearbox. Also, a known constant speed generator may be used with rough and fine tuning as well as an accumulator for input to a known gearbox and generator to ensure constant speed of the electric generator. Rough tuning is the control of the rotational speed of the waterwheel by opening and closing the hatch depending on water flow. Fine tuning is a secondary control, controlling the rotational velocity of the waterwheel shaft already controlled by the rough hatch control.

Various platforms for a run-of-the-river or ocean current turbine are discussed herein. Besides the river or ocean floor bottom platform wherein the water flow is fed from the top of the block, the turbine may be mounted to a floating platform. The Free Flow Power Mississippi River embodiment of a run-of-the-river turbine may have been dipped under the water surface and mounted on a platform or on the river bottom. In embodiments of the present invention, other than the turbine (waterwheel) and hatch, all components including hatch control, RPM control, gearbox, and generator may be mounted to the top of a floating platform but similarly be connected to a power grid by lines to the land. In a further embodiment, a vertical wall parallel to the water flow may be built or already present such as a platform of a bridge for mounting run-of-the-river turbines on one side or both sides of the platform. In drastic direction changes of water flow such as, for example, when the high tide water flows in and then reverses course for low tide and flows out of ocean tributaries back to the ocean, the turbine may be side-fed and have one turbine facing in one direction and the other turbine facing in the reverse direction (one for each of high and low tide). Embodiments of run-of-the-river turbines of the present invention may be side-mounted and side-fed from each side of a bridge bulkhead below the water level or be mounted on a horizontal platform, from the river bottom, a floating platform or made otherwise horizontal. In a further embodiment, the present run-of-the-river or ocean currents turbine may be fed from its side with the waterwheel mounted on a pole and have a tail wing in the event that river current, for example, may vary slightly from a normal direction to another direction (for example, the tidal estuary example given above). The pole and tail concept also can be applied to hatch-controlled vertical axis wind turbines.

These several technologies will be further described with reference to particular applications in rivers with varying directional currents, ocean currents, tidal currents, wave currents and the like. All such technologies promote a more efficient, more reliable turbine having a higher power generation capability to a power grid than may be known according to the state of the art. The several technologies are depicted in the drawings, a brief description of which follows.

BRIEF DESCRIPTION OF THE DRAWINGS

The features and advantages of the present invention will become more apparent from the detailed description set forth below when taken in conjunction with the drawings in which like reference numbers may indicate identical or functionally similar elements.

FIG. 1 (PRIOR ART) comprises a table showing United States Electric Energy sources as broken down into coal, natural gas, petroleum, nuclear energy and renewable energy in bulk including all types of renewables.

FIG. 2 (PRIOR ART) comprises a table showing United States renewable electric energy as broken down among, biomass energy, hydroelectric energy, geothermal energy, wind energy and solar energy in order of greatest to least percentage of all U.S. renewable energy.

FIG. 5 shows a plurality of conventional mechanical speed converters under development including a belt and pulley converter, Tortrak converter and a Fallbrook converter having friction and traction drives and being infinitely variable as well as a DDMotion ratchet-type speed converter, for example, known from FIGS. 10 and 11 of U.S. Pat. No. 8,641,570 which is scalable (while the others are not scalable) and has a gear drive.

FIG. 7 comprises a perspective view of a turbine intended to rest on the river bottom which was once available from Free Flow Power Corp. and may have been mounted on a river bottom platform; FIG. 8 comprises a mechanical drawing in side view of a tidal or river current turbine where the direction of water flow A is from right to left and may be used with tidal or river currents; FIG. 9 is a front view of a rotating ring having hydrofoils mounted on and therein for tidal estuaries and rivers known from Oceana Energy Company; and FIG. 10 is a perspective view of a known propeller driven turbine standing on the floor of an ocean for tidal energy generation.

FIG. 15A and FIG. 15B (PRIOR ART) show cross-sectional drawings of a typical hydroelectric power generator of a river dam comprising a penstock for channeling water under high pressure head from a deeper portion of the dam to a generator and turbine where the water is allowed to return downstream to the river below the dam after running through an electric generator powerhouse.

FIG. 16A, FIG. 16B, FIG. 16C and FIG. 16D show a DDMotion run-of-the-river turbine as first introduced in embodiments depicted in FIGS. 11 and 12 of U.S. Pat. No. 8,485,933 with hatch control, for example, provided by a spring-loaded hatch based on water flow where FIG. 16A shows the hatch fully open; FIG. 16B shows the hatch partially closed; FIG. 16C shows abnormal conditions, for example, flood conditions, when the hatch may be fully closed; and FIG. 16D shows a top view where waterwheel protector ribs 1630 are better seen protecting the rotor blades of the waterwheel from sea weed or floating debris.

FIG. 17A through FIG. 17D comprise mechanical assembly diagrams for a basic spur gear Transgear assembly, first appearing as FIG. 4B of U.S. Pat. No. 8,388,481; FIG. 1 of U.S. Pat. No. 8,485,933; and FIG. 3 of U.S. Pat. No. 8,641,570, wherein FIG. 17A is a left side view along line A-A; FIG. 17B is a front view; FIG. 17C is a right side view along line B-B; and FIG. 17D is a perspective view of a Transgear assembly from side B (with a carrier disc removed for clarity).

FIG. 18B shows a top view comprising the block, wheel and hatch in top view with water guides (venturi) or protector ribs for channeling water over the block and a waterwheel shaft and FIG. 18C shows a cross-sectional view mechanical moving components including the waterwheel 1608 and waterwheel shaft 1820 where the waterwheel shaft 1820 is the input to a spur gear Transgear assembly of FIG. 17A, FIG. 17B and FIG. 17C in cross-sectional view and the power take-off (PTO) output is the sleeve 1706 surrounding the waterwheel output shaft and the Transgear assembly may be a power take-off switch.

FIG. 27A through FIG. 27D show rated speed graphs and overview mechanical diagrams comprising cross-sectional views of moving components of maintaining waterwheel rotational speed within predetermined limits per rated speed using Transgear assemblies and a worm and a worm gear control assemblies wherein FIG. 27A and FIG. 27B are rated speed graphs and FIG. 27C shows holding to decrease rotational speed (waterwheel speed is designed to be faster than the rated speed as shown in FIG. 27A) and FIG. 27D shows holding to increase rotational speed (waterwheel speed is designed to be slower than the rated speed as shown in FIG. 27B).

FIGS. 28A and 28B show an overview of using FIG. 27C and FIG. 27D together, FIG. 28B being a cross-sectional view of moving components having a single worm and a worm gear assembly controlling both to increase rotational speed and to decrease rotational speed during either draught or flood conditions. The waterwheel speed is designed to be the rated speed as shown in FIG. 28A.

FIG. 29A, FIG. 29B and FIG. 29C show respective mechanical diagrams in cross-sectional views of moving components of a DDMotion's basic spur gear Transgear assembly having two independent inputs and an output. As shown in FIG. 29A, input #1 is carrier through a shaft 2905, input #2 is top sun gear 2901 through a sleeve 2910, and the output is bottom sun gear 2902 through a sleeve 2930. As shown in FIG. 29B, two inputs are carrier through a shaft 2930 and bottom sun gear 2902 through a sleeve 2910 and the output is top sun gear 2901 through a sleeve 2930. As shown in FIG. 29C, the two inputs are top sun gear 2901 through a sleeve 2905 and bottom sun gear 2902 through a sleeve 2910 and the output is the carrier through a shaft 2930.

FIG. 29C is used to accumulate two inputs (rough and fine) to one output toward a gearbox and generator (not shown).

FIG. 34A and FIG. 34B comprise top views of side-fed run-of-the-river turbines of the present invention mounted to one side of a vertical wall per FIG. 34A that may be continuous or a vertical wall that may be contoured (has a platform) and mounted to a horizontal platform per FIG. 34B.

FIG. 35A comprises a top view of a side-fed run-of-the-river turbine mounted for rotational movement to a pole seen in side view FIG. 35B secured to a platform or to a river bed whereby a tail wing may serve to point the side-fed run-of-the-river turbine into the direction of water flow. This concept also can be applied to hatch controlled wind turbines with wheel type rotor, either vertical axis or horizontal axis.

FIG. 36A and FIG. 36B show exemplary embodiments for use, for example, in a tidal estuary where the tide may shift direction from toward the inland (high tide) to toward the ocean (low tide) wherein each of two turbines are oppositely aligned so that one or the other is actuated during either high or low tide.

Drawings of the present invention should not be considered to be drawn to scale and the respective size of components or shapes may be varied to suit a particular application such as for use in an ocean current, a large river, a small mountain stream and so on. These applications of variations and technologies of novel run-of-the-river turbines with respect to various embodiments will be further described in the detailed description of the drawings which follows.

DETAILED DESCRIPTION

Figure 30:
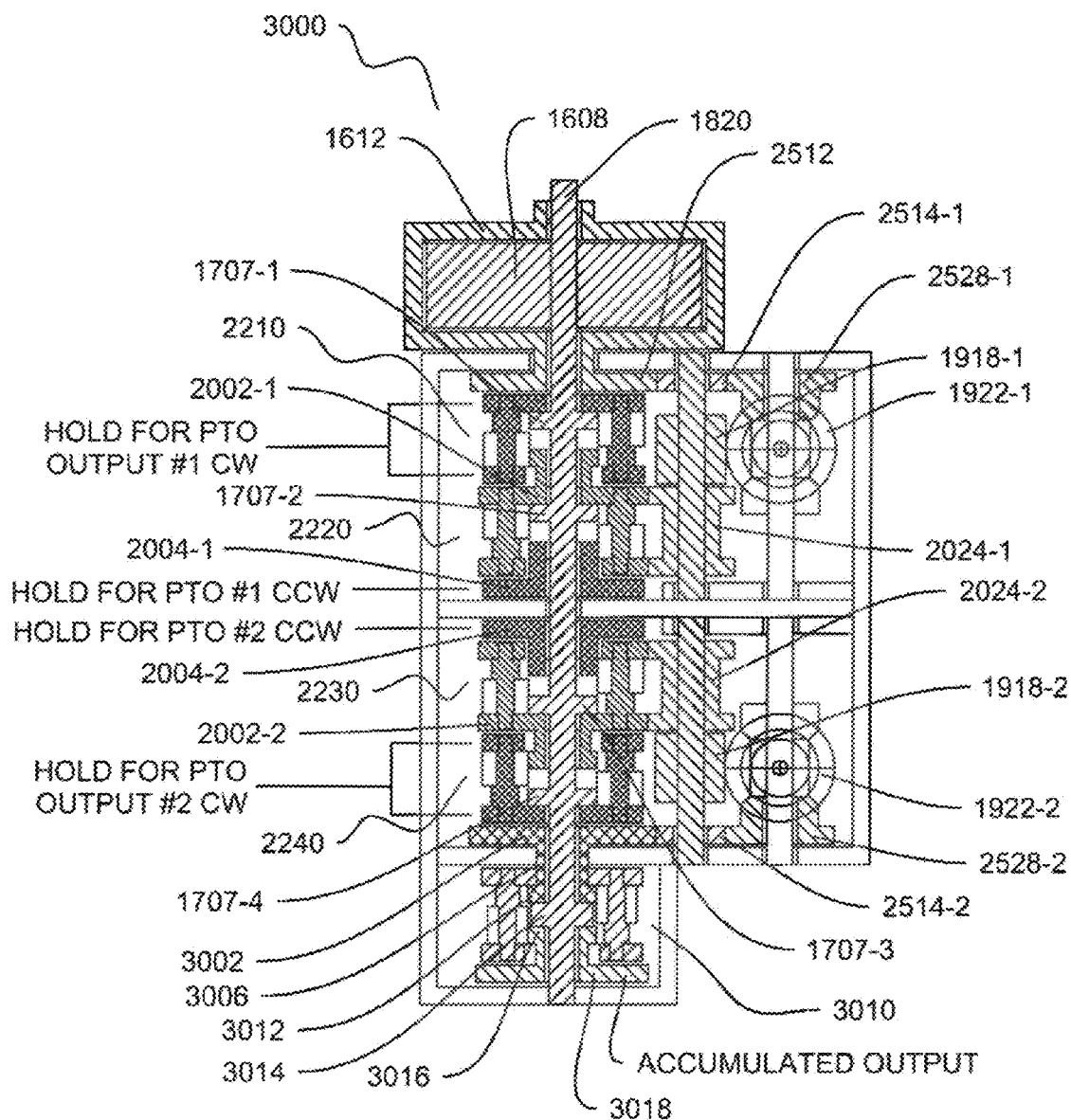
FIG. 30 shows a mechanical diagram comprising a cross-sectional view of moving components of a further embodiment of a river turbine of the present invention wherein first and second power take-off controls, each comprising a Transgear assembly and a worm and a worm gear assembly are utilized for rough and fine control while a further Transgear embodiment according to one of FIG. 29A, FIG. 29B
Figure 31:
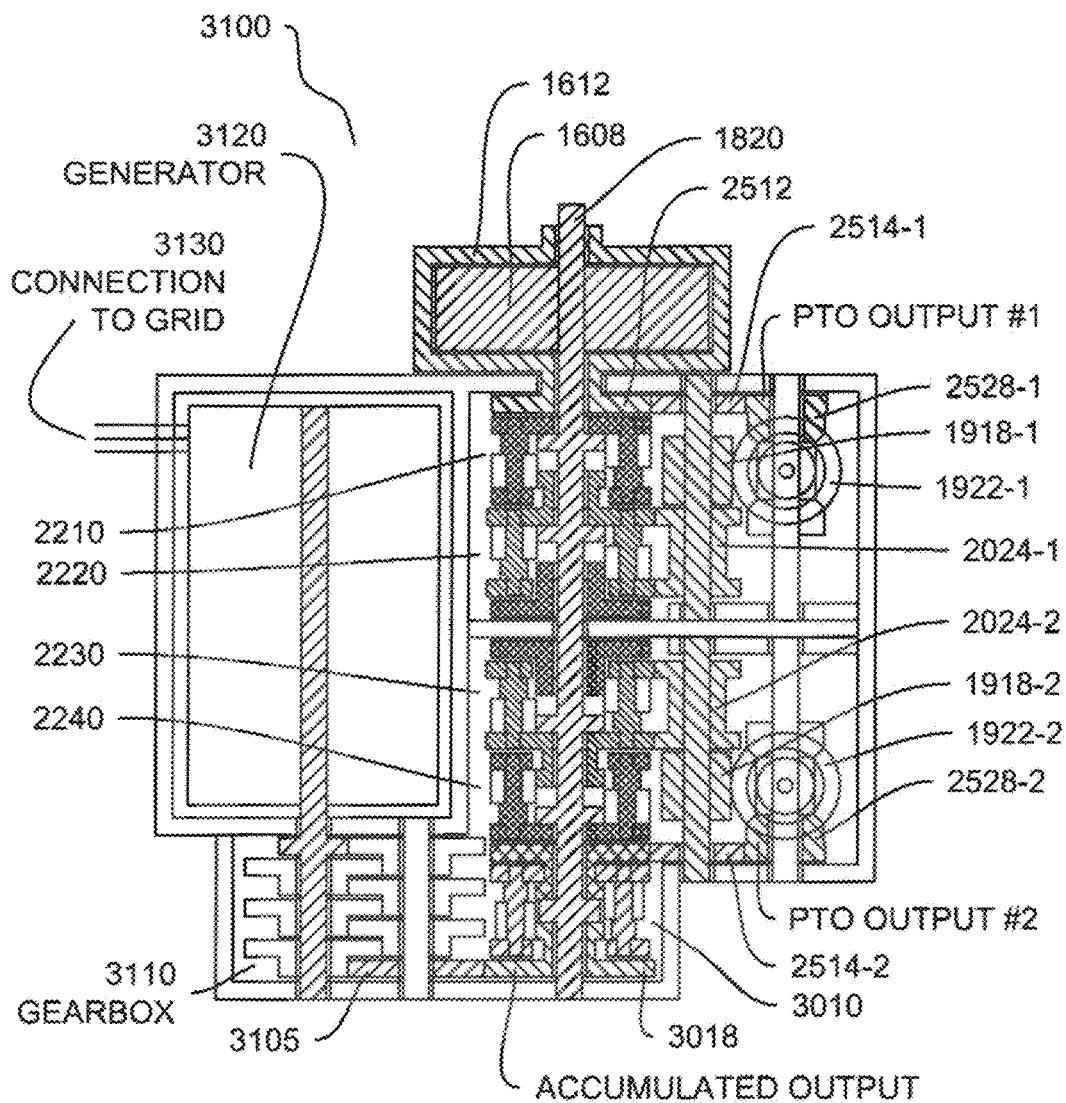
FIG. 31 provides a mechanical diagram comprising a cross-sectional view of moving components for providing hatch control (rough tuning), fine tuning (rpm adjustment), accumulation, and a gearbox to provide a constant and increased rotational speed output, and a constant speed generator.

The present invention is directed to applications of, for example, a run-of-the-river turbine having a block (or penstock equivalent), a waterwheel (turbine equivalent), a hatch (wicket gate equivalent), Transgear assembly controls and a constant speed generator whereby the Transgear assembly may be variously used as a hatch control (rough tuning), rpm adjustment (fine tuning) and an accumulator. Embodiments and various aspects of embodiments will be described with reference to FIGS. 16-37 wherein FIG. 16A-FIG. 16D provide an overview of hatch control; FIG. 17A-FIG. 17C show an embodiment of a basic spur gear Transgear assembly; FIG. 18A-FIG. 22 show several embodiments of power take-off push switches utilizing a Transgear assembly; FIG. 27A-FIG. 28B relate to embodiments utilizing Transgear assemblies for providing a constant output speed and, thus, a constant electrical frequency for feeding to a grid; FIG. 29A, FIG. 29B and FIG. 29C show the use of a Transgear assembly having two inputs and one output; FIG. 30 provides an overview of a run-of-the-river turbine controlled to provide rough and fine tuning and accumulating the two inputs to one output using a Transgear assembly of FIG. 29A, FIG. 29B or FIG. 29(C); FIG. 31 shows the addition to FIG. 30 of a gearbox and a known constant speed generator for output to an electrical grid; and FIGS. 32 through 37B show various mounting arrangements for a water turbine of the present invention whereby applications may include tidal currents, river currents and ocean currents and show how a generator and gear assemblies may be efficiently housed inside a waterwheel and be centered about the waterwheel shaft. Consequently, many figures showing cross-sectional views of moving components are not drawn to scale including but not limited to FIGS. 18C, 19-22, FIG. 25, FIG. 27C and FIG. 27D, FIG. 28B and FIGS. 30-31.

Figure 11A:
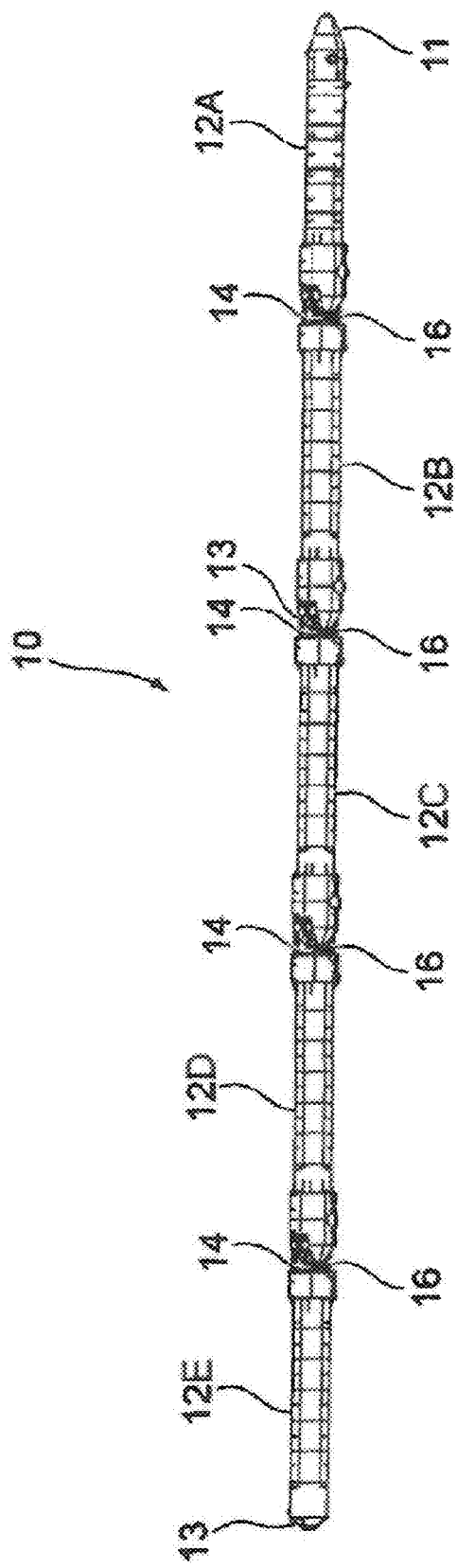
FIG. 11A (PRIOR ART) is a mechanical diagram in side view of an ocean wave power generation system available from Pelamis Wave Power comprising a plurality of sections which rise and fall with wave motion, the movement of the sections caused by the wave motion thus generating power as seen in wave motion diagrams FIG. 11B and FIG. 11C.
Figure 11C:
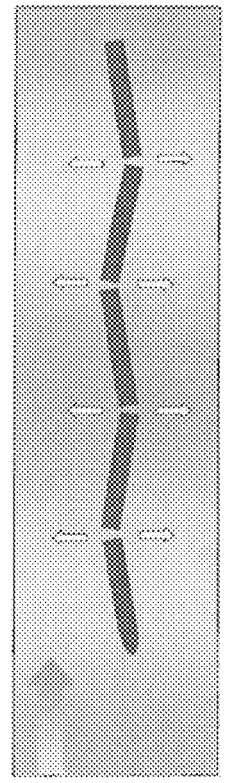
Figure 11B:
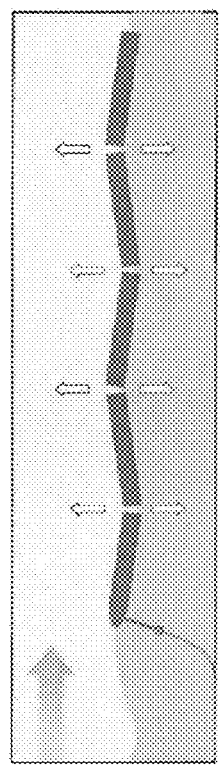
Figure 12:
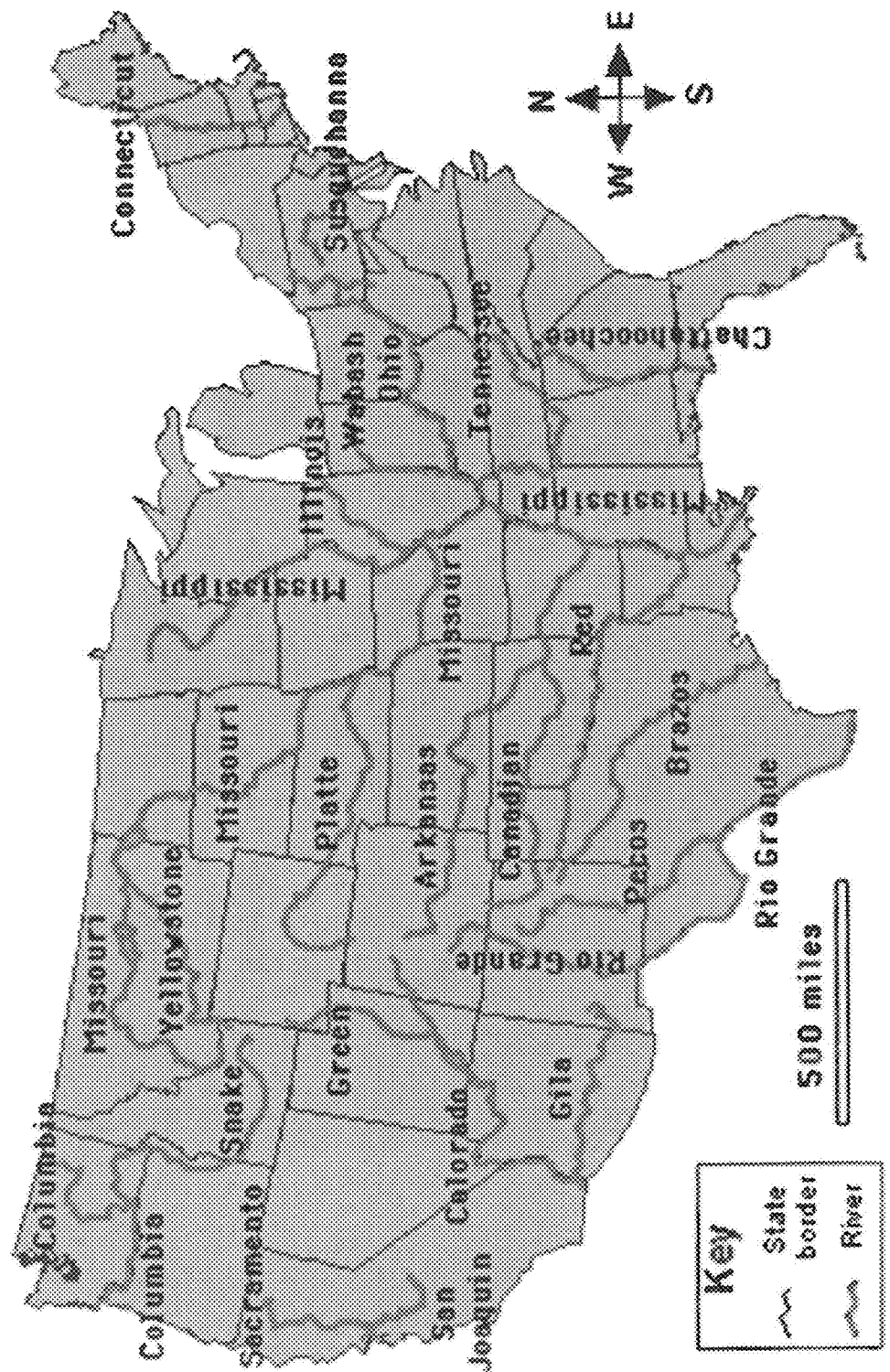
FIG. 12 (PRIOR ART) shows a known map of the United States with major rivers shown.
Figure 13:
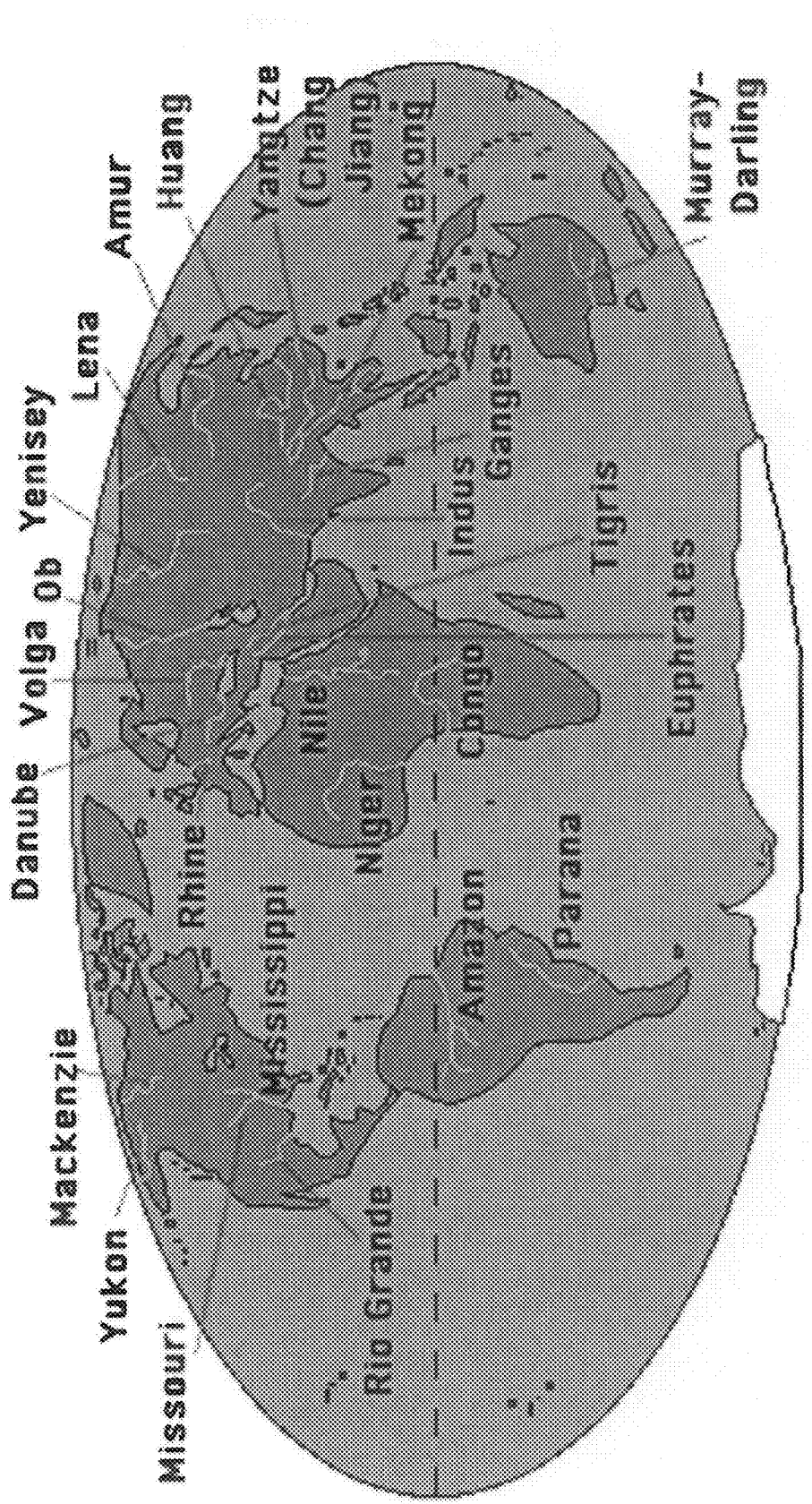
FIG. 13 (PRIOR ART) shows a known map of the world with major rivers shown.
Figure 14:
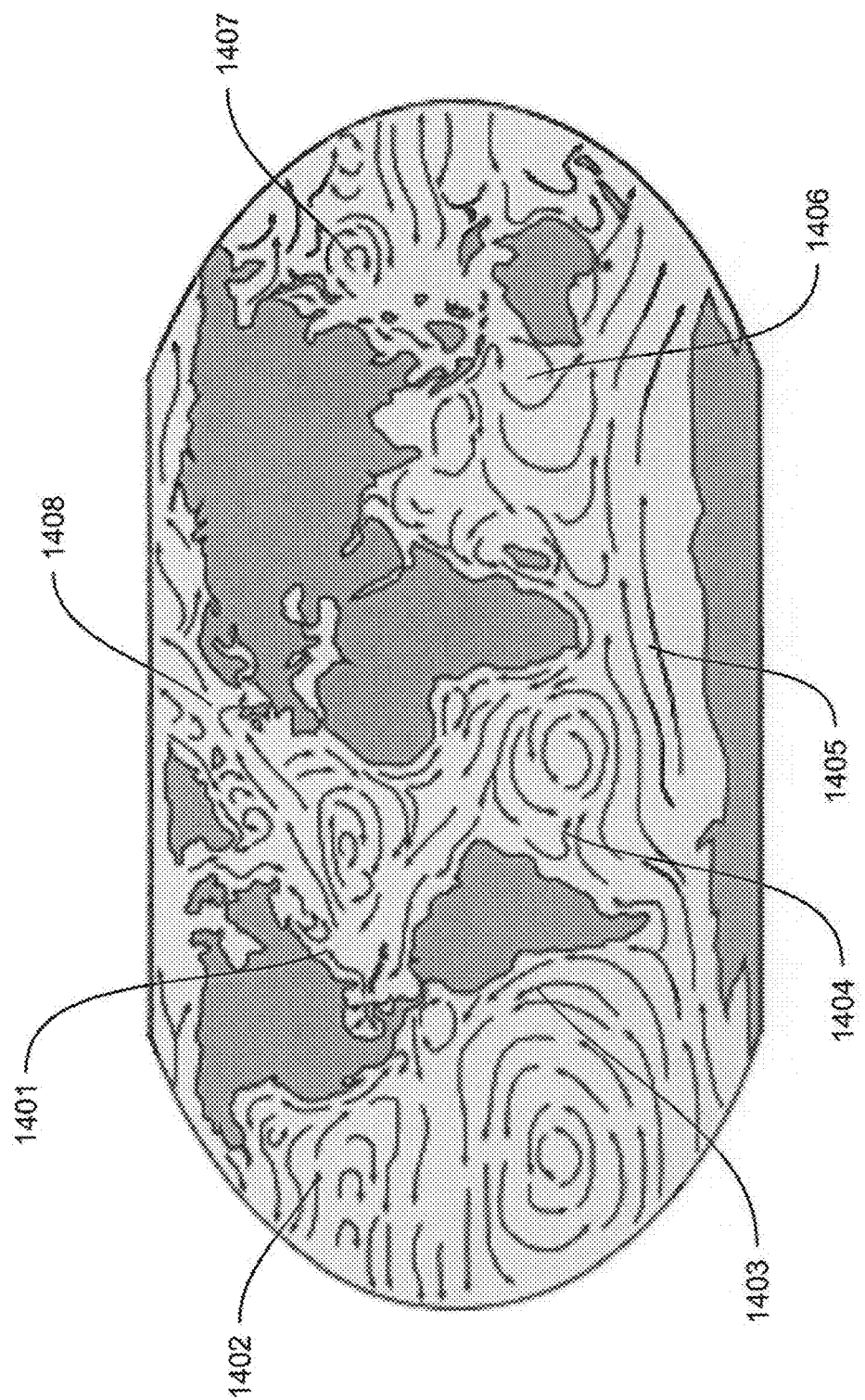
FIG. 14 (PRIOR ART) shows a known map of the world showing major ocean currents.

Referring first to FIG. 16A through FIG. 16D, a basic run-of-the-river or ocean current turbine 1600 of the present invention replaces a known variable frequency converter (VFC), sometimes known as a power converter or power electronics, from the wind turbine arts with a scalable, Transgear controlled assembly involving a hatch 1612 which is positioned proximate to a block 1605 serving as a penstock to turn a waterwheel 1608 at controlled speed. The depicted embodiment is fed at the top and intended to be mounted on a platform, for example, a river bottom platform 1640, constructed on a river or ocean bed, sufficiently high off the floor so as not to collect mud, sand or debris at the base of the platform 1640. Protector ribs 1630 protect the apparatus from floating debris and may help channel the water flow to the waterwheel 1608. Assuming that a river or ocean current will have a change of rate of water flow during conditions ranging from drought to flood or in dangerous weather conditions, the hatch 1612 is intended to be controlled to limit the amount of water flow to the waterwheel (speed of the water flow), the water flow shown entering at the left. The water flow is at increased velocity as it moves up the block (penstock) 1605 and comes in contact with a waterwheel 1608 such that the waterwheel rotates due the mass and velocity of the water at great rotational speed. In one embodiment, a simple spring may be attached to hatch 1612 and the hatch equipped with a lip to catch rising water flow as per FIGS. 11(C) and 12(C) of U.S. Pat. No. 8,485,933. The hatch may be thus regulated to control the velocity of the water flowing by the lip rising against the tension of the spring and, if at sufficiently high velocity, the water flow has sufficient mass and velocity to close the hatch completely during extreme conditions such as flood conditions (but the waterwheel may be controlled to still rotate at a constant speed). Alternatively, per the '933 patent's FIGS. 11(B) and 12(B), top views, means are shown 1116, 1206/1205 are shown providing a water flow indication to control box 1121, 1210 to control variable ratio gear 1118 for constant speed generator 1119. In FIG. 12(B), a servo-motor 1206 is provided for input compensation as well as flow control in addition to servo motor 1116 and worm 1115 for hatch control via hatch bracket 1108.

Per FIG. 16A, the hatch 1612 is shown fully open and suffices for drought and normal expected water flow except in less typical situations. For example, during a heavy rain, the hatch 1612 may be partially closed over waterwheel 1608 to limit the rotational speed of the waterwheel 1608 per FIG. 16B. In FIG. 16C, the hatch 1610 may be fully closed, for example, during extreme flood conditions. The principles of the '933 patent FIGS. 11 and 12 and other figures may be further followed to provide a constant speed generator from a variable speed input, well known in the art, and has the advantage that no expensive dams need be built, water traffic is not impacted, and, by building a series of such turbines along the length of a river, hydrokinetic energy may be captured throughout the length of a river, such as the Mississippi river. Because the embodiments are entirely mechanical and gear controlled, there is greater scalability, reliability and efficiency. It is believed that one such turbine 1600 may generate as many as several megawatts of electricity—far greater than solar or wind energy and at less cost than building a dam.

Figure 3:
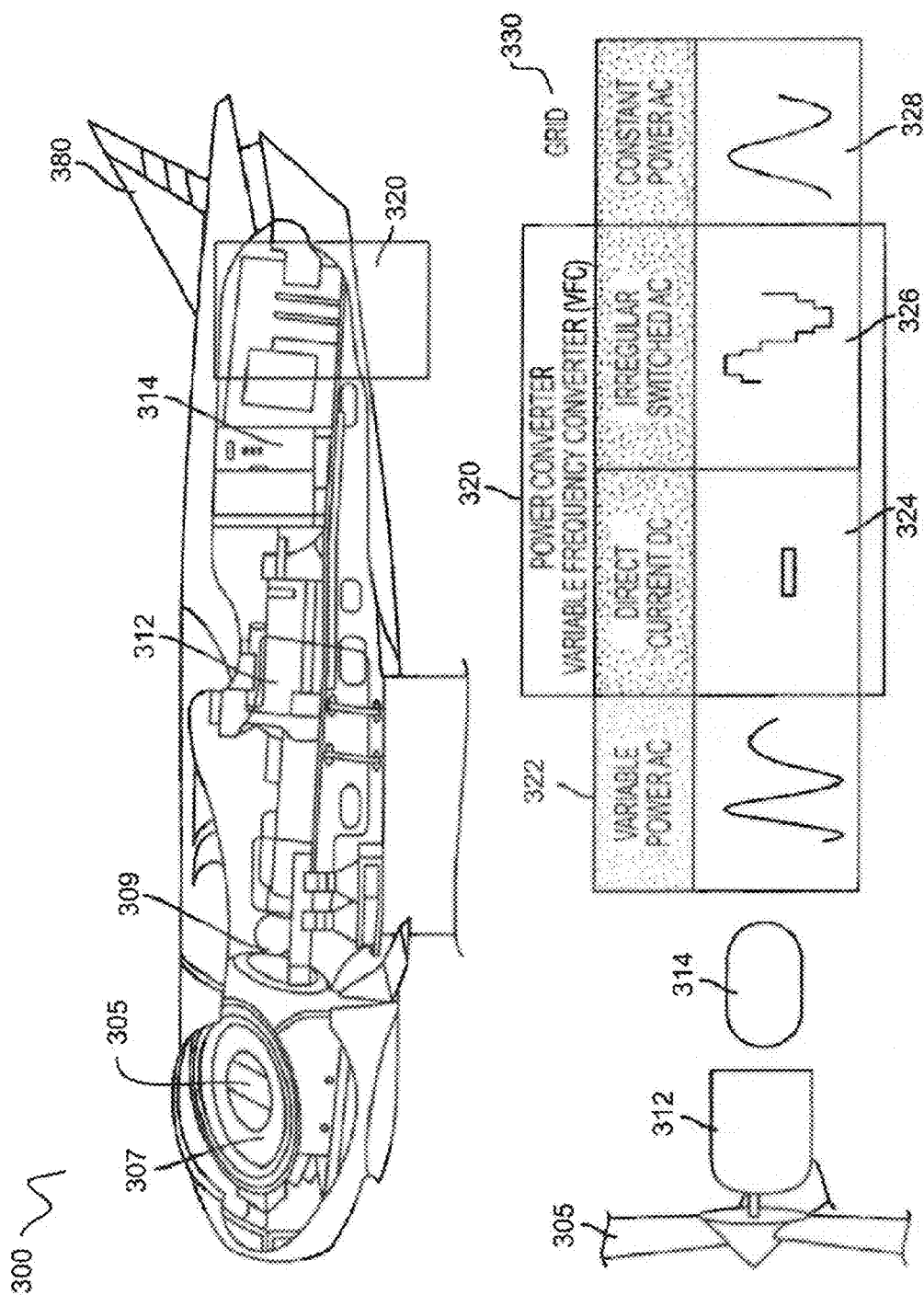
FIG. 3 (PRIOR ART) shows a known or conventional wind turbine and its internal construction as first represented as FIG. 1 of U.S. Pat. No. 8,388,481.
Figure 4:
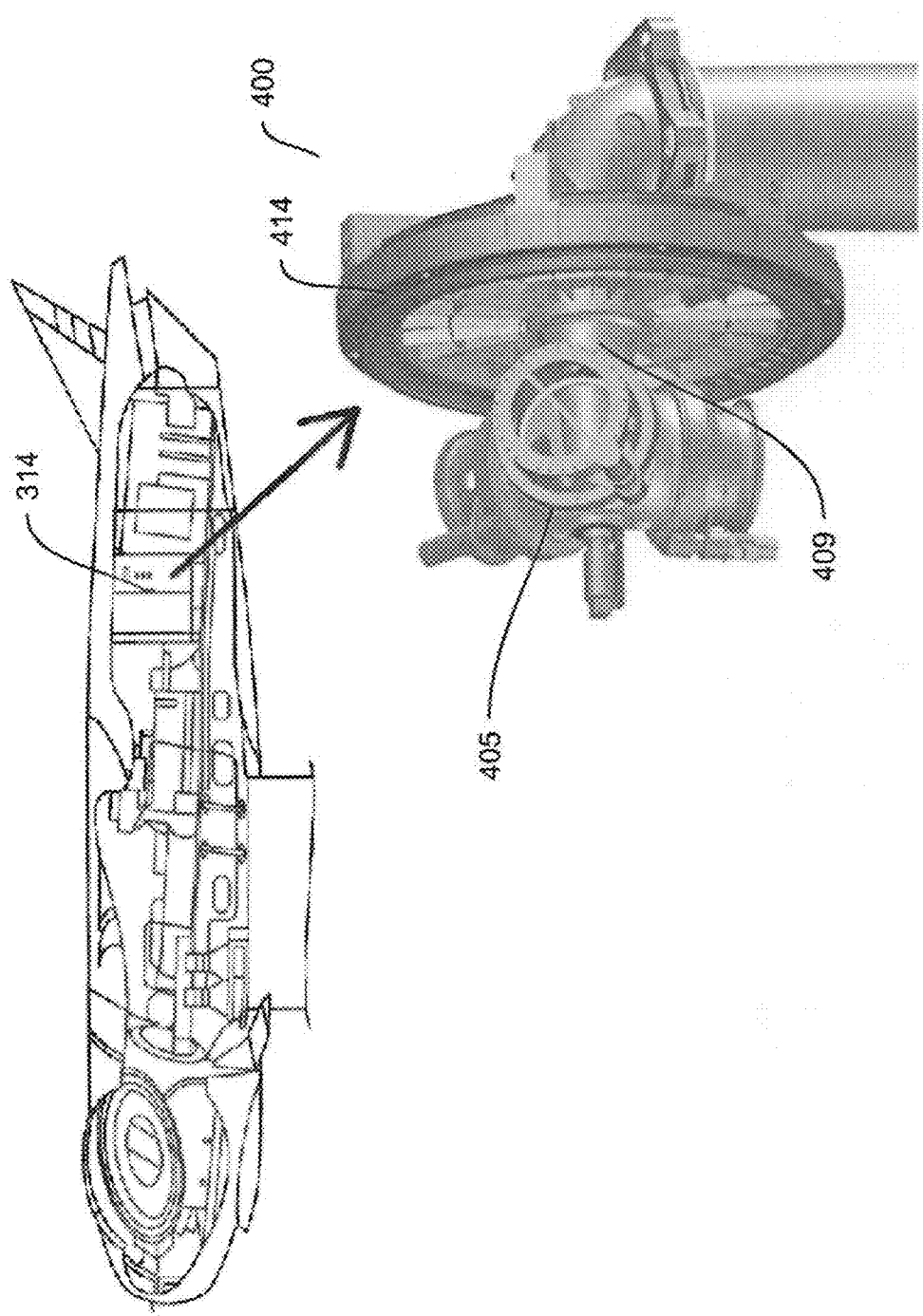
FIG. 4 (PRIOR ART) shows a Figure of the conventional wind turbine of FIG. 3 for comparison purposes, the wind turbine being without a gearbox, having a generator with an increased number of generator poles, having direct drive for the wind turbine, the direct drive having failure and replacement cost issues as with conventional wind turbines. The conversion of variable rotor (propeller) speed to a constant electrical frequency output is a problem shared by wind and water turbines.
Figure 6:
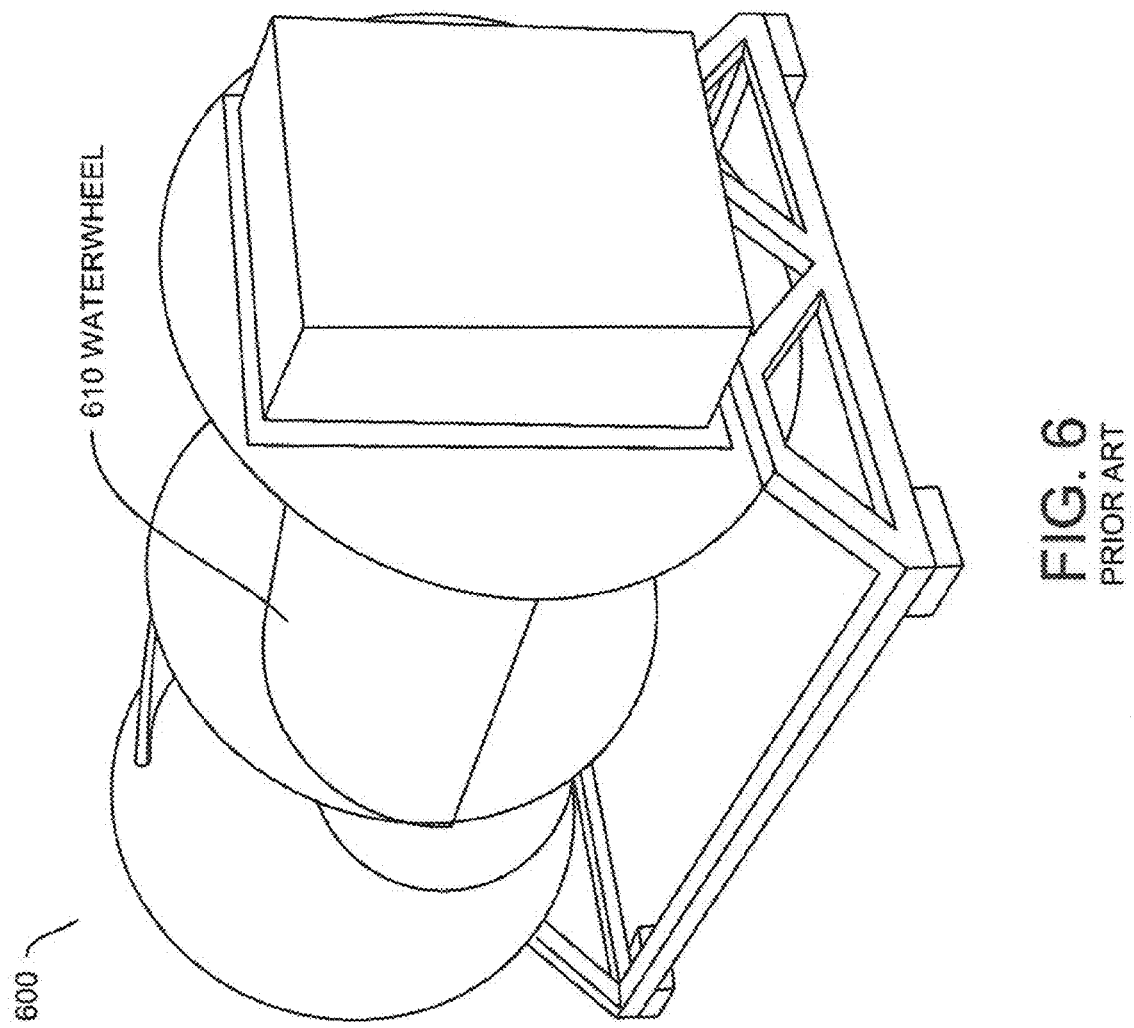
FIGS. 6-10 (PRIOR ART) show various turbines known in the art from various manufacturers wherein FIG. 6 comprises a perspective view of a waterwheel turbine known from Hydrovolts, Inc. for use in spillways and canals.
Figure 7:
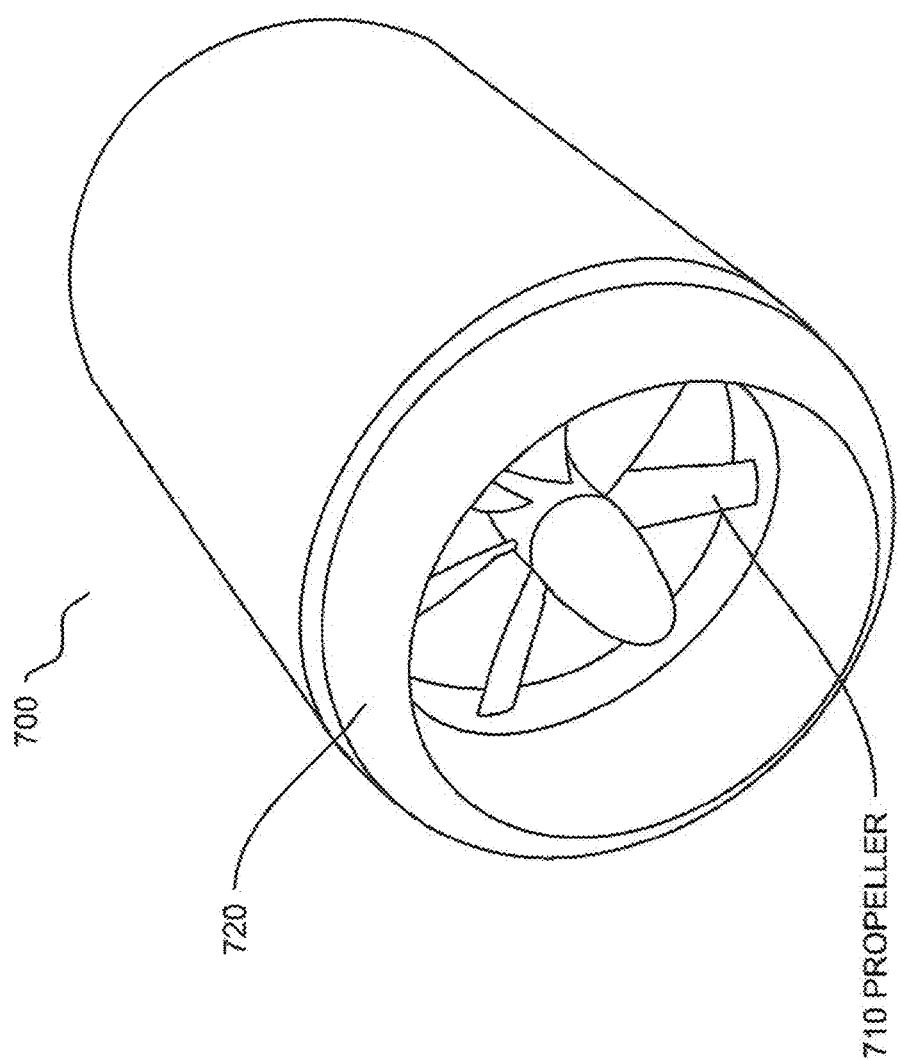
Figure 8:
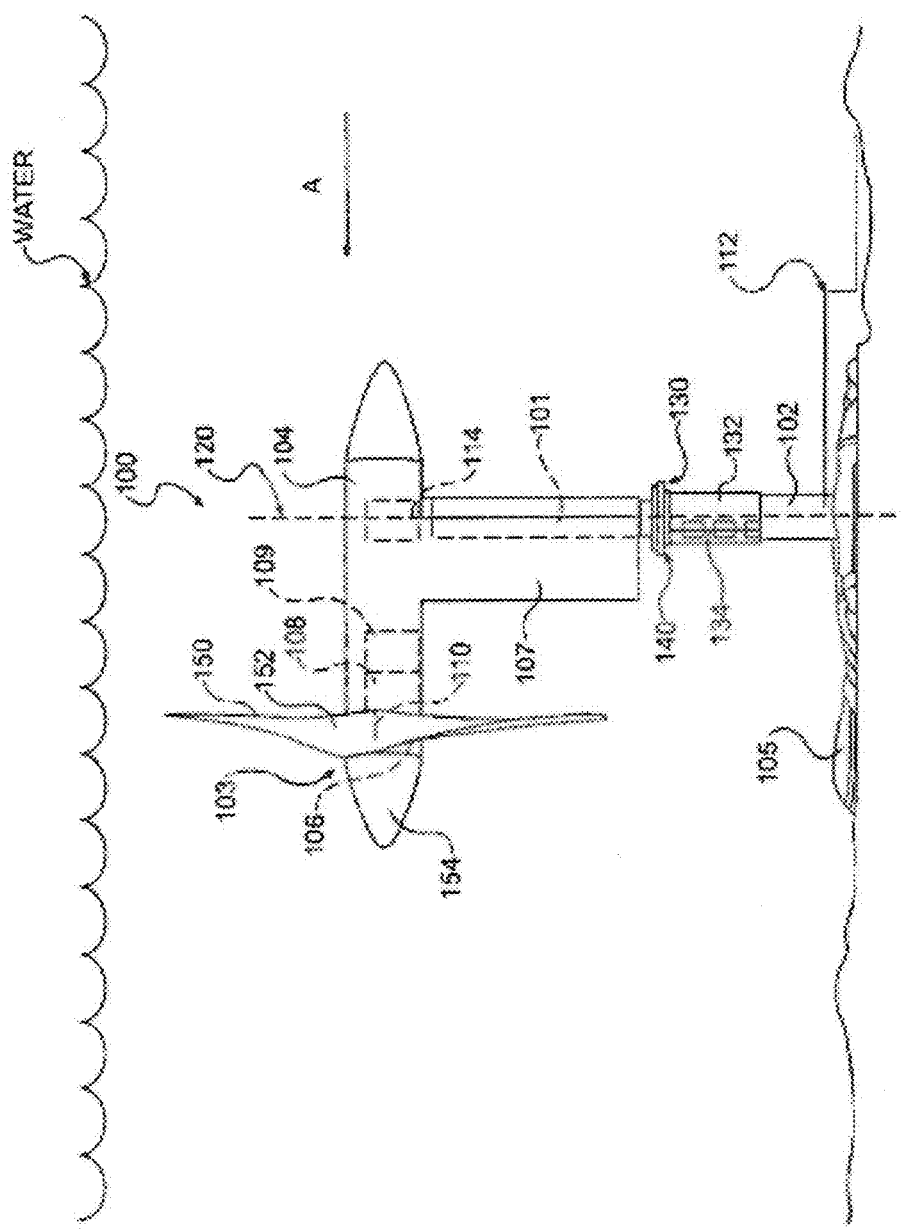
Figures 9, 10:
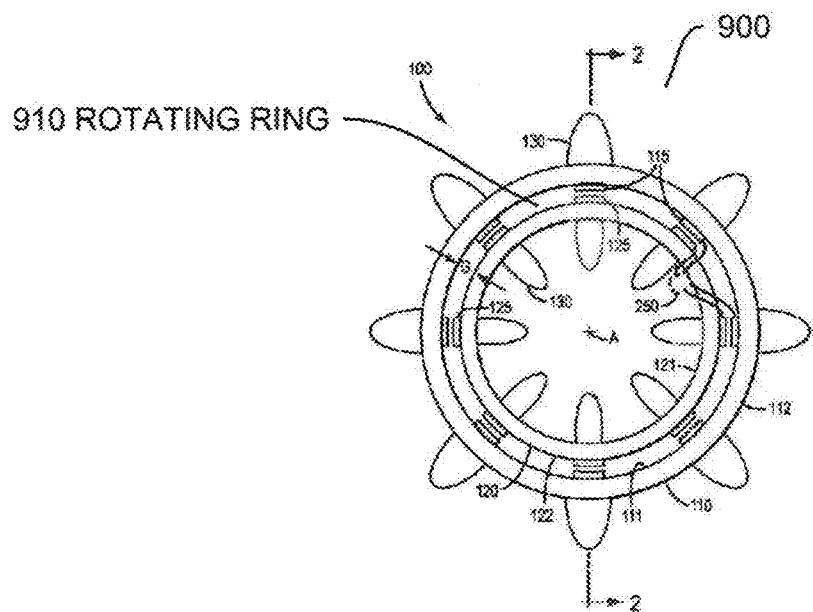

A controlling component (three variable control technology) is a Transgear assembly in the construction of a run-of-the-river or ocean current turbine according to embodiments of the present invention. As will be discussed herein, the Transgear assembly may provide hatch control, rpm control, and serve as an input accumulator and serve as a power take-off switch in several embodiments. One such basic spur gear Transgear assembly is shown in FIG. 17A left side view per line A-A, FIG. 17B front view and 17C right side view per line B-B. FIG. 17D provides a perspective view of side view FIG. 17B. These will be further explained below. Other Transgear assembly embodiments include, but are not limited to those shown in FIG. 3C for speed control of a wind turbine, FIG. 4B, FIG. 5A, FIG. 6B, FIGS. 7 and 10 for feedback control, from U.S. Pat. No. 8,388,481 directed to variable flow to constant speed conversion. In U.S. Pat. No. 8,485,933, reference should be made to the spur gear Transgear assembly of FIGS. 1(A), (B) and (C), spur gear Transgear clutches of FIGS. 2(A), (B) and (C) and the IVMC speed converter of FIG. 4 and the use of variable ratio gear 1119 to control constant speed generator 1119 in FIGS. 11(B) and 12(B). Referring to U.S. Pat. No. 8,641,570, reference should be made to a bevel gear Transgear assembly of FIG. 1, a ring gear Transgear assembly of FIG. 2, a basic spur gear Transgear assembly of FIG. 3, and further spur gear Transgear assemblies of FIG. 4(A) through 6(B). All these may be used as alternatives to the basic spur gear Transgear assembly of FIG. 17A, FIG. 17B and FIG. 17C individually or in combination as discussed further herein to produce various power take-off switch embodiments, accumulate inputs and regulate speed.

Referring now to FIG. 17A, FIG. 17B and FIG. 17C, a basic spur gear Transgear assembly comprises a shaft 1701 having a first sun gear 1707 connected or integral with the shaft 1701, a sleeve 1706 surrounding the shaft having a second sun gear 1705 connected to or integral with the sleeve 1706. The first and second sun gears 1707, 1705 are coupled together by a control assembly comprising, for example, carrier discs or gears 1708, 1709, pins 1710-1 through 1710-4 and planetary gears 1703-1 through 1703-4. In the embodiment depicted, a shaft is designated 1701. Left sun gear 1707 is shown connected to or integral with shaft 1701. Sleeve 1706 surrounds shaft 1701. Right sun gear 1705 is shown connected to or integral with sleeve 1706. As control, there is an assembly above and below the shaft, left and right sun gears and sleeve comprising carrier gears 1708, 1709, pins 1710-1 through 1710-4 and planetary gears 1703-1 through 1703-4. In left or right side view, the planetary gears 1703-1 to 1703-4 are seen surrounding respective pins 1710-1 to 1710-4. A similar structure for control is shown below. The basic concept is three variable control—input, output and control. This principle is used throughout the following discussed embodiments, for example, of FIG. 18A through FIG. 22 for showing power take-off switches for the hatched water turbine with block shown in FIG. 16A through FIG. 16C.

Figure 18A:
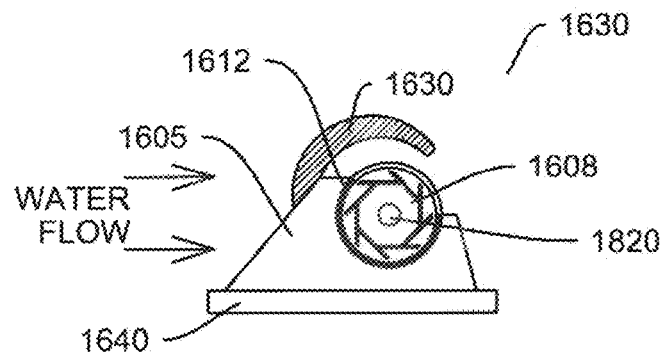
FIG. 18A through FIG. 18C provide mechanical diagrams of a run-of-the-river or ocean current turbine of an embodiment of the present invention wherein FIG. 18A provides a side view showing the block, waterwheel and hatch of FIG. 16A resting on a platform.
Figure 18B:
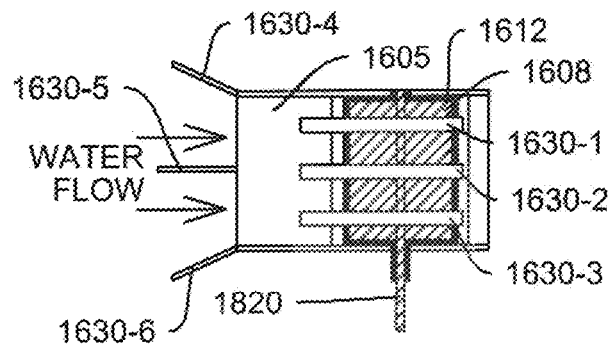
Figure 18C:
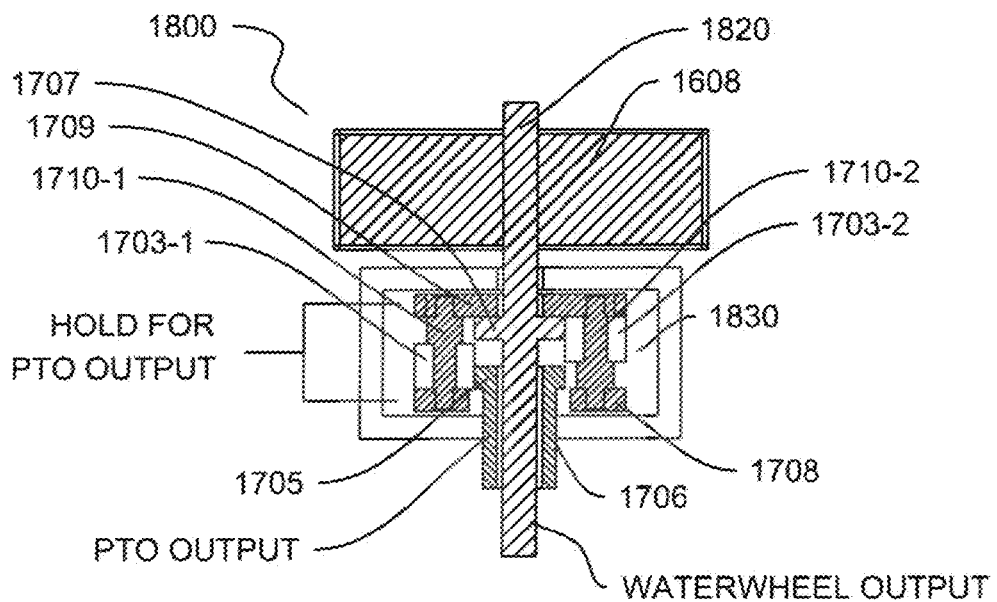

Referring now to FIG. 18A through FIG. 18C, there is shown the embodiment of FIG. 16A through FIG. 1.6C of a waterwheel assembly 1800 shown mounted on a platform for top-fed water flow from the left. FIG. 18B shows a top view of FIG. 18A so that inwardly slanted protector ribs 1630-4 through 1630-6 are seen for gathering water flow from the left to proceed up the block and to the waterwheel 1608. Between the block and the protector ribs 1630-4 to 1630-6, water flow increases velocity as it comes in contact with a rotor blade of the waterwheel 1608. FIG. 18C provides further details in cross-sectional view of moving components of a simplified push switch (power take-off) comprising a basic spur gear Transgear 1830. To the left may be seen a control input holding carrier discs 1708 and 1709 (there are two carrier discs joined by pins), for example, hold for power take-off output. In this example, the waterwheel 1608 turns the shaft 1820 and first sun gear associated with the shaft 1820. Control is provided from the left and the power take-off output (normally neutral) is provided by the depicted sleeve 1706 surrounding the shaft 1820 and its associated second sun gear 1705. The waterwheel 1608 and shaft 1820 controlled as will be further described herein generate a waterwheel output which may be fed to a gearbox to regulate rotational limits within predetermined bounds and then proceed to turn a turbine and associated electricity generator at a desired frequency, for example, 60 Hz (50 Hz European). Note that the basic spur gear Transgear assembly depicted in FIG. 18C comprises first and second carriers 1708, 1709, first and second pins 1710-1, 1710-2 and first and second planetary gears 1703-1 and 1703-2 (there are four planetary gears total) as control. Planetary gears 1703-3 and 1703-4 may be seen in FIG. 17A through FIG. 17D but are hidden in FIG. 18C.

Figure 19:
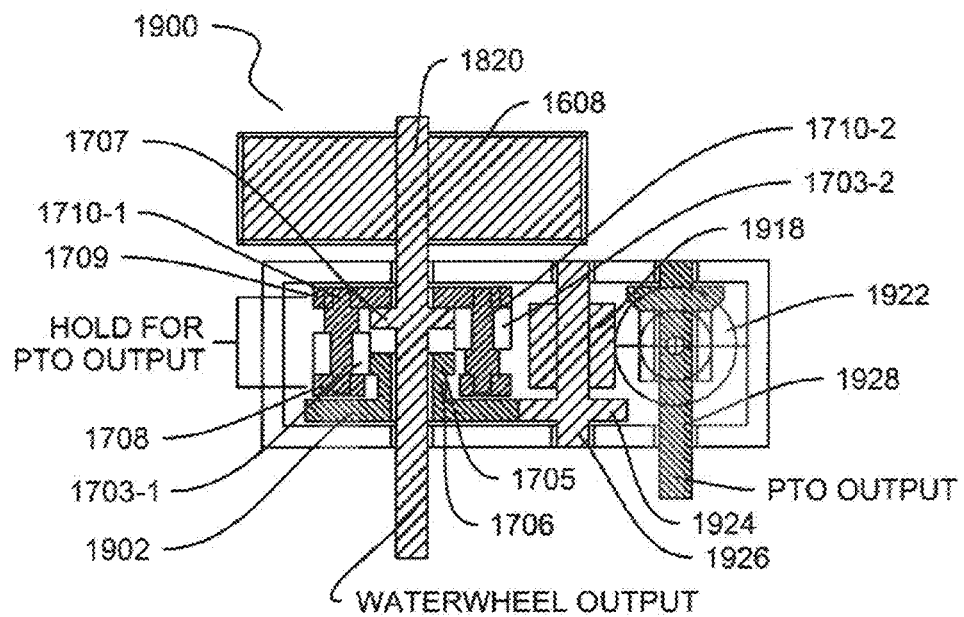
FIG. 19 provides a mechanical diagram comprising a cross-sectional view of moving components of a second embodiment of a run-of-the-river or ocean current turbine having a worm and a worm gear assembly control of power take-off via the worm gear to an accentuated spur gear Transgear assembly where a control gear is meshed with the worm gear assembly and via a disc to a sleeve to the right sun gear providing control of the left sun gear of the waterwheel input shaft wherein carrier gears are held for power take-off output and the worm gear shaft 1928 is normally locked.

Referring now to FIG. 19, there is shown a cross-section of components of an enhanced embodiment (not to scale) of the embodiment of FIG. 18 also showing a push switch (power take-off (PTO)) with the same waterwheel input shaft 1820, first sun gear 1707, sleeve 1706, second sun gear 1705 and similar control. The present control, however, has been modified to comprise a large diameter gear 1902 referred to herein as a sun gear extension gear connected to or integral with the sleeve 1706 that is meshed with a control gear 1924 and control shaft 1926 of a worm 1918 and worm gear 1922 of a worm and worm gear assembly, surrounding the worm gear shaft 1928. The hold for PTO output is still provided from the left, but the PTO output (normally locked) is provided the worm gear shaft 1928. A similar worm, worm gear, bevel gear assembly will be seen in further embodiments discussed below.

Figure 20:
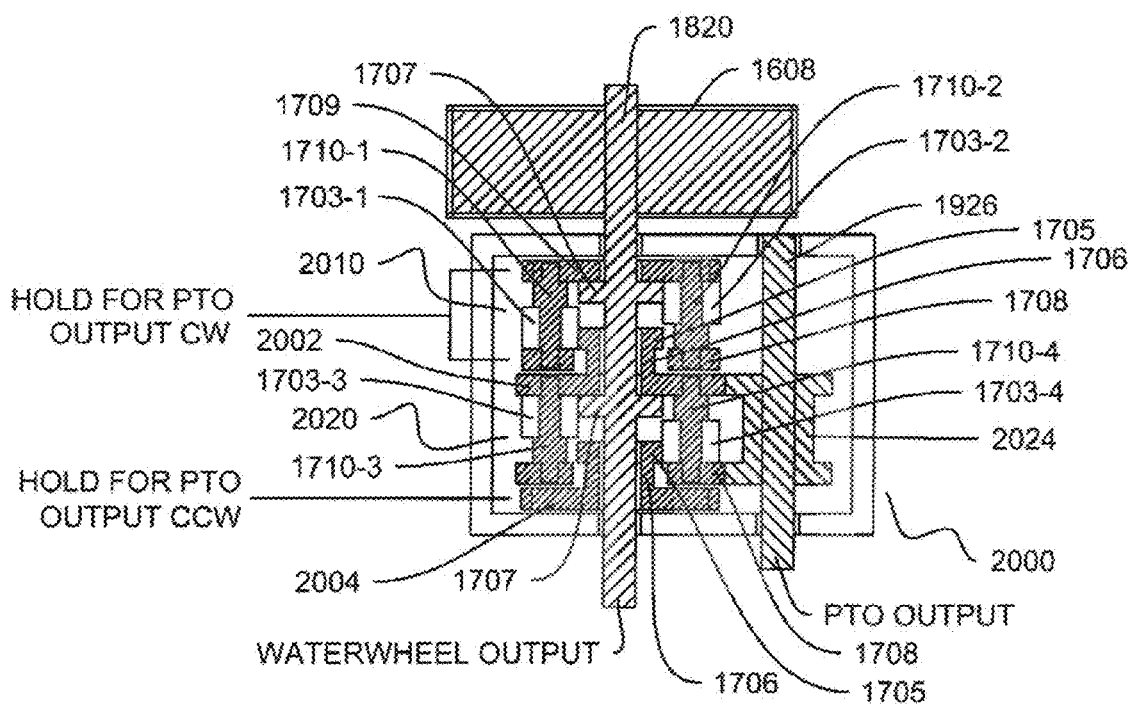
FIG. 20 provides a mechanical diagram comprising a cross-sectional view of moving components of a bi-directional switch, power take-off (PTO), for a waterwheel and input shaft, the bi-directional switch comprising first and second spur gear Transgear assemblies, one being a basic spur gear assembly with a hold for clockwise output and a second assembly with a hold for counter clockwise rotation having a control gear connected to or coupled with a sleeve and right sun gear so that the PTO output may be in either direction of water flow.

Referring now to FIG. 20, FIG. 20 provides a further cross-section of an enhanced power take-off 2000 wherein two rotational directions are compensated. A housing surrounds a first Transgear assembly 2010 proximate the waterwheel 1608 and wherein the waterwheel shaft 1820 is the shaft having a first sun gear 1707. A sleeve 1706 and second sun gear 1705 are seen below coupling to a second Transgear assembly 2020 via sun/carrier gear 2002. The Transgear assembly 2010 has a hold for PTO output clockwise rotation and the Transgear assembly 2020 has a hold for PTO output counterclockwise via sun gear extension disc 2004. Shaft 1926 is connected to control gear 2024 where the PTO output is normally neutral. In this embodiment the first and second Transgear assemblies are coupled to the shaft 1926 (normally neutral) for bi-directional rotation of the waterwheel output. An example of an application of such a power take-off switch 2000 would be for tidal flow in estuaries where the tide flows in for high tide and then the tide flows out for low tide on a daily basis so the waterwheel 1608 may have power take-off in either rotational direction depending on the tidal flow. This bi-directional embodiment may be further enhanced using the worm gear control assembly already introduced and now will be described with reference to FIG. 21.

Figure 21:
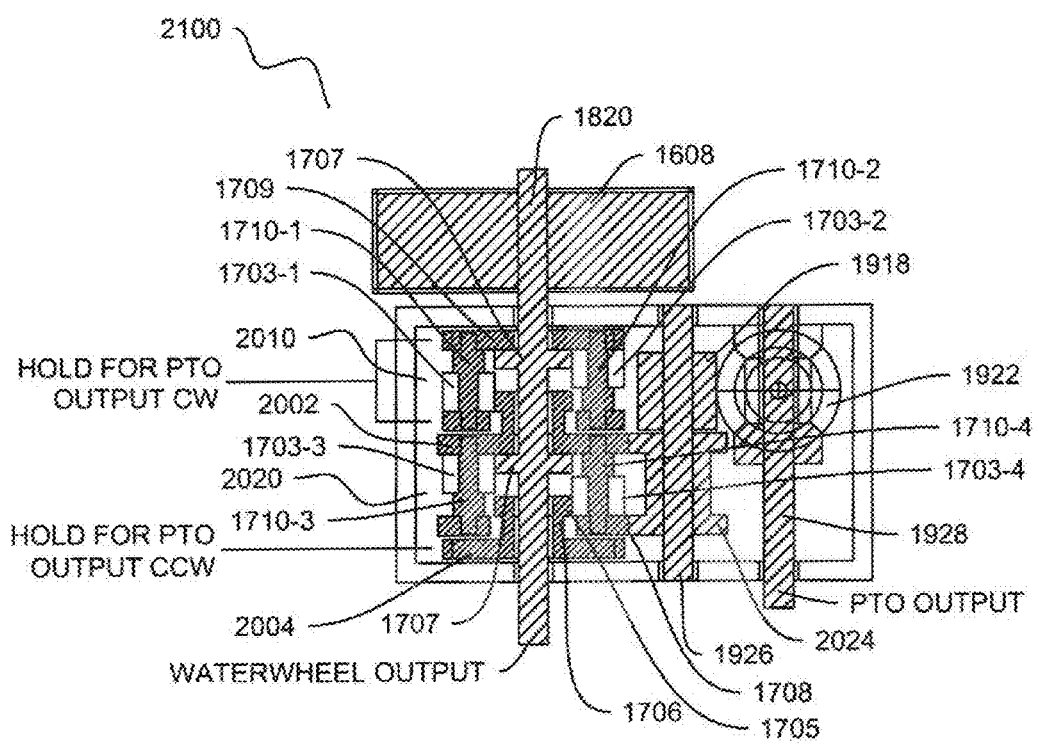
FIG. 21 provides a mechanical diagram comprising a cross-sectional view of moving components of a further bi-directional switch, power take-off (PTO) for a waterwheel and input shaft having first and second spur gear Transgear assemblies, one for each direction of input shaft rotation and a worm and worm gear assembly in addition to a control gear and shaft for controlling the power take-off output.

Referring now to FIG. 21, there is shown a further embodiment (in cross-section, not to scale) of a bi-directional switch (PTO) having at left with respect to first Transgear assembly 2010, a hold for PTO output clockwise and with respect to Transgear assembly 2020 a hold for PTO output counterclockwise. In this embodiment, a bevel, worm, worm gear assembly is repeated as first introduced in FIG. 19 with worm 1918, worm gear 1922 but including control gear 2024 on control shaft 1926 wherein the worm gear shaft 1928 is normally locked, but when the tide comes in or goes out actuates PTO for counter or counterclockwise rotation of the waterwheel 1608. The PTO output is provided by the worm gear shaft 1928. A final power take-off embodiment will be now discussed with reference to FIG. 22 having two sets of bi-directional switches (PTO) where only one set was shown in FIG. 21.

Figure 22:
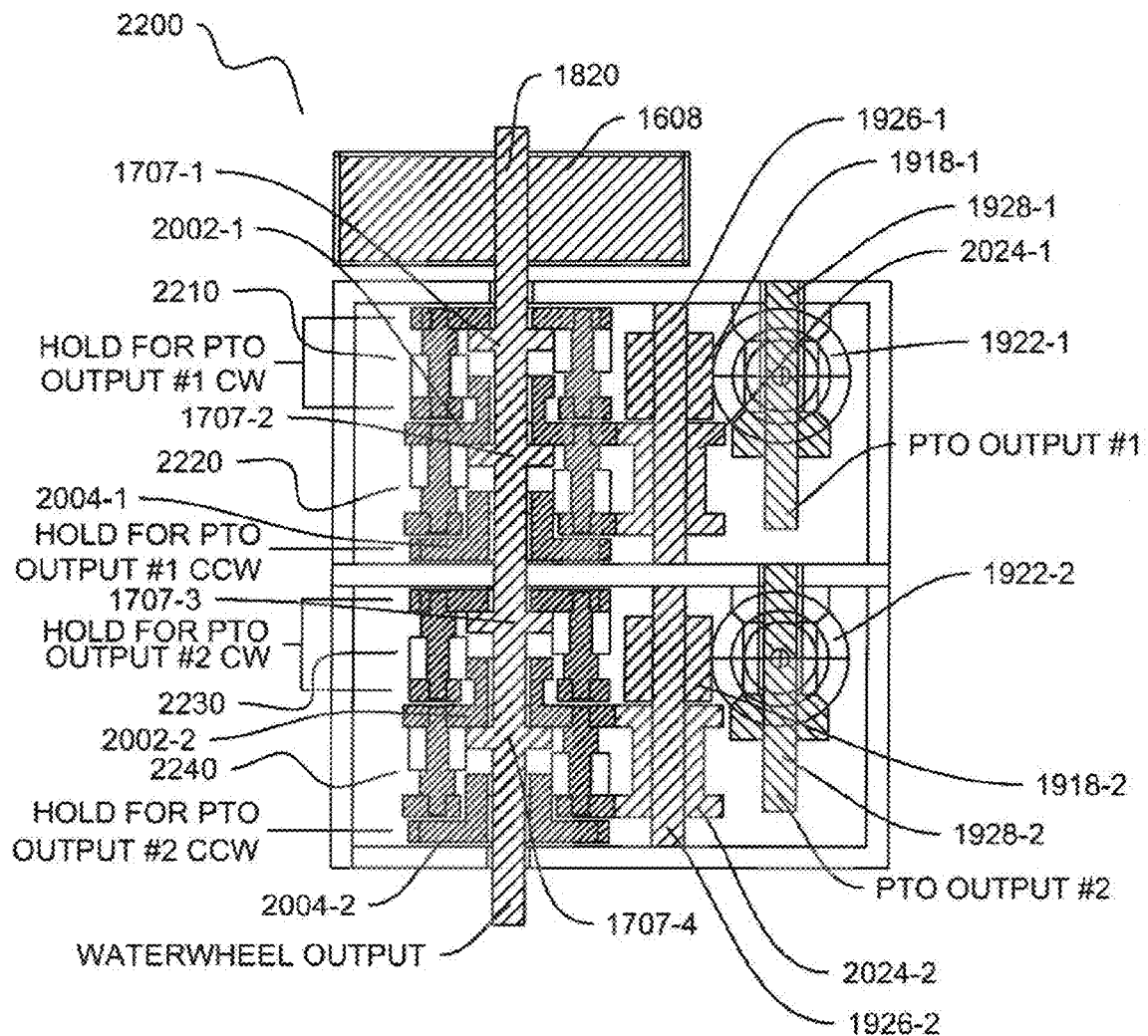
FIG. 22 provides a mechanical diagram comprising a cross-sectional view of moving components being two sets of bi-directional switches, power take-off (PTO) showing that multiple sets of switches are possible for switching rotational direction of the input shaft vis-à-vis first and second power take-off outputs of corresponding worm and worm gear assemblies; (each pair of Transgear and worm and worm gear assemblies may be either for clockwise or counter-clockwise rotation).

FIG. 22 provides a mechanical diagram (cross-section of components, not to scale) of such a pair of bi-directional switches (PTO) shown as embodiment 2200. With respect to the four Transgear assemblies in embodiment 2200, in the first pair of Transgear assemblies 2210 and 2220, the Transgear assembly 2210 has hold for PTO output #1 clockwise rotation and Transgear assembly 2220 has hold for PTO output #1 counterclockwise rotation with the same bevel, worm, worm gear assembly shown and described above for pair of Transgear assemblies 2210 and 2220. The waterwheel shaft 1820 passes through both pairs of Transgear assemblies where the third and fourth Transgear assemblies 2230, 2240 are controlled by a second bevel, worm, worm gear assembly. In the second pair of Transgear assemblies 2230 and 2240, the Transgear assembly 2230 has hold for PTO output #2 clockwise rotation and Transgear assembly 2240 has hold for PTO output #2 counter clock-wise direction, with the same bevel, worm, worm gear assembly shown and described above, for pair of Transgear assemblies 2230 and 2240. At the right, with respect to embodiment 2200, the PTO output #1 for clockwise and counterclockwise rotational directions, provided by shaft 1928-1, is normally locked as is the PTO output #2 for clockwise and counterclockwise rotational directions provided by the shaft 1928-2. This FIG. 22 demonstrates that multiple sets of PTO switches are possible for the same waterwheel 1608. All four Transgear assemblies are operated via the same waterwheel shaft 1820 and so, per FIG. 37, may be all contained within the waterwheel. Now hatch control will be described with reference to FIG. 23 through FIG. 25 wherein FIG. 23 comprises the simplest control, namely a spring-loaded hatch and hatch lip for receiving water flow and acting to pull on the spring.

Figure 23:
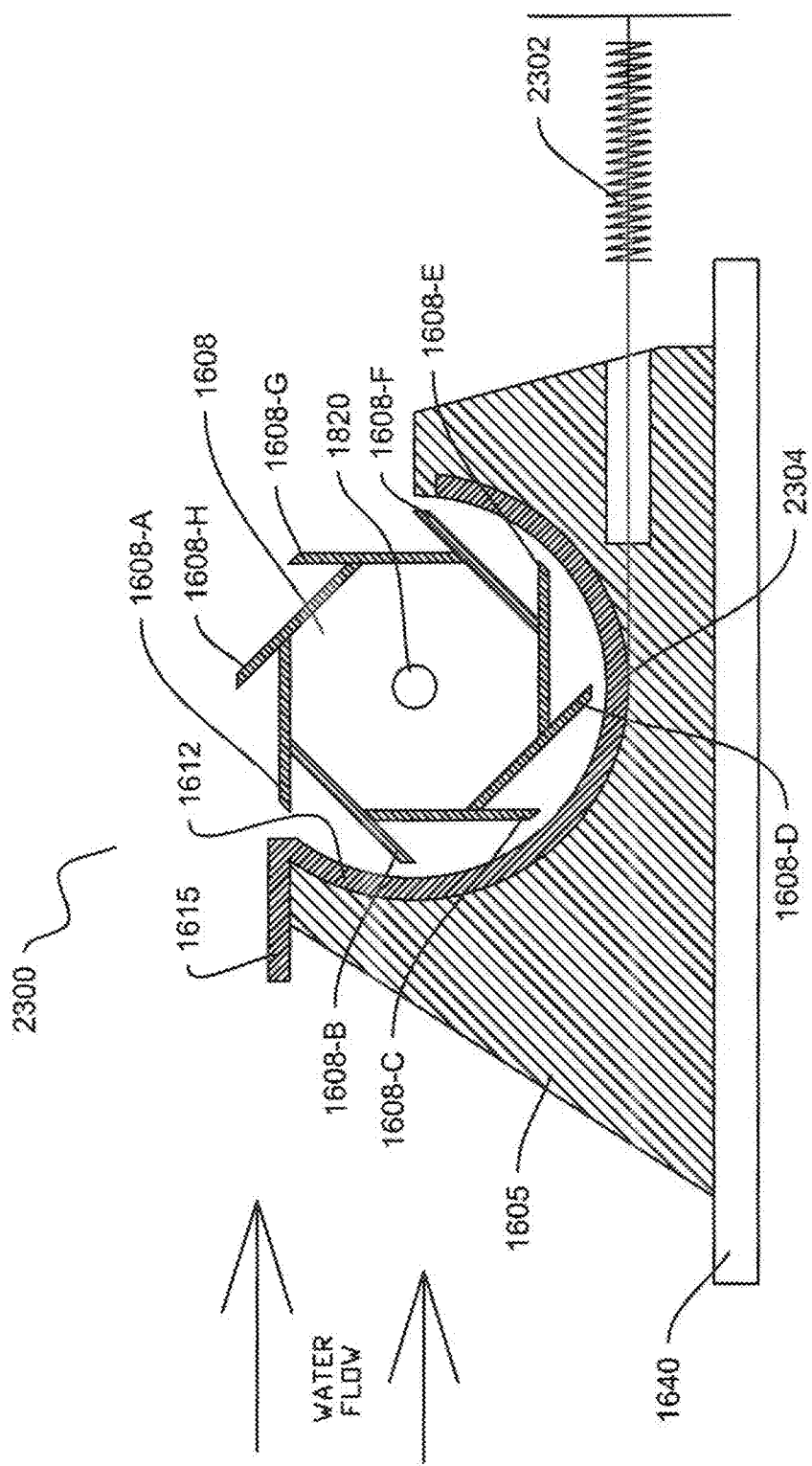
FIG. 23 shows a spring-controlled hatch lip as first seen in FIG. 11(C) and FIG. 12(C) of U.S. Pat. No. 8,485,933 where the water flowing up the block 1605 may lift the hatch lip 1615 upward, lifting and closing the hatch as countered by the tension of a spring 2302 attached to the hatch 1612.

FIG. 23 provides a mechanical diagram of the waterwheel of FIG. 16 modified to show a hatch lip 1615. Waterwheel 1608 may comprise eight rotor blades 1608-A through 1608-H where, for example, rotor blade 1608-A is shown in a horizontal position and rotor blade 1608-G is shown ready to receive a water flow from the left as the water flows over block 1605 and, due to its slant, the block 1605 acts like a penstock and increases water velocity and delivers water as the water hits hatch lip 1615. If the tension and spring constant of spring 2302 (spring 2302 is attached to the hatch, the attachment point, not shown, being a design choice) are strong or high, then, the hatch lip 1615 may not move with, for example, expected water flow. On the other hand, as water flow velocity increases beyond a norm, the hatch lip 1615 will rise, pulling on spring 2302, and the water flow velocity may decrease as the hatch lip 1615 and hatch 1612 attached thereto rises and so prevents water flow from reaching the waterwheel 1608 at such velocity as to raise the hatch lip 1615. FIG. 23 thus provides a simple form of hatch control dependent on spring constant and water velocity coming in contact with the hatch lip 1615. The rotor blades of waterwheel 1608 are drawn straight and the number of rotor blades may be fixed, for example, at eight but the blade shape and the number of rotor blades may be optimized depending on the given conditions and applications (river, tide, ocean current, typical weather in the geographical area of application and so on).

Figure 24:
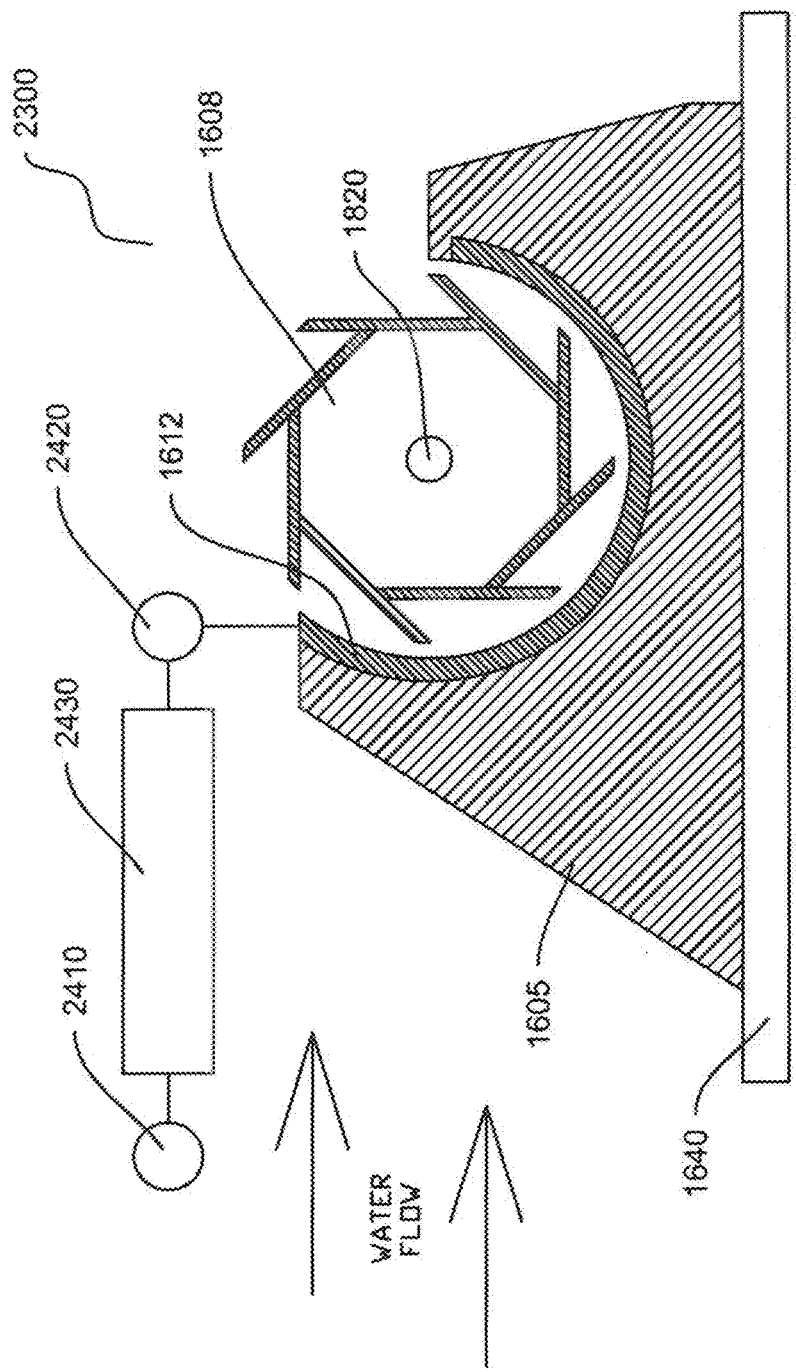
FIG. 24 shows a simplified diagram of the flow-actuated processor as first seen in FIGS. 11(B) and 12(B) of U.S. Pat. No. 8,485,933 where the water flow is shown in these top views being input to a processor for controlling a variable speed to constant speed generator or the movement of a hatch via a servo-motor.

Referring now to FIG. 24, a second form of hatch control utilizing a sensor 2410, such as a known flow rate sensor, a water flow direction sensor, a measurement of the rotor RPM or the generator RPM, may trigger a processor 2430 to actuate an actuator 2420 which may comprise a servo motor, a power supply, a battery and controls for the hatch 1612. A flow rate or direction sensor may be located, for example, at the top of block 1605, just before (or after) the water flows to the waterwheel 1608. In this manner, control is not simply left to a spring but may be more directly related to the sensor chosen as exemplary of water flow, water direction or the water flow or direction itself. In some embodiments, the servo-motor and power supply and the like may be powered by stored power or generated power of the run-of-the-river turbine embodiment. Now, a third option for hatch control will be discussed involving first and second Transgear assemblies and a bevel, worm, worm gear assembly as introduced above with reference to FIG. 25.

Figure 25:
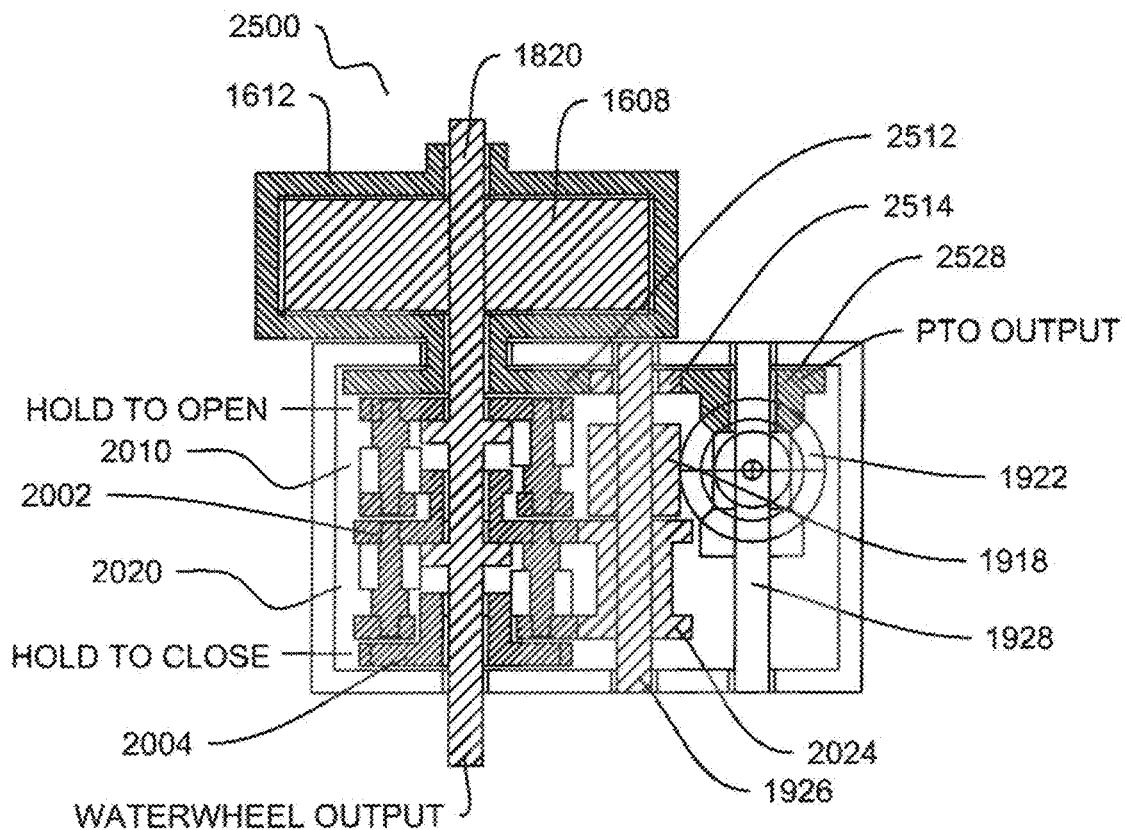
FIG. 25 shows a cross-sectional view of moving components of a waterwheel hatch control assembly comprising first and second Transgear assemblies and a worm and a worm gear assembly including hold to open and hold to close the hatch inputs.

FIG. 25 provides a mechanical diagram (cross-section of moving components) of a hatch control embodiment 2500 in top view of a water wheel 1608 not showing protector ribs or flaps that can move but with a hatch 1612 reaching into the engagement with Transgear assembly 2010 via hatch gear 2512. Idle gear 2514 may engage hatch gear 2512. The hatch 1612 (and moving ribs) may be controlled using Transgear technology. A second Transgear assembly 2020 is held to close and a first Transgear assembly 2010 is held to open within embodiment 2500 depending on actuation via the worm and worm gear assembly 1918, 1922 where the hatch 1612 is shown connected to the Transgear assemblies 2010 and 2020 and regulated by the bevel gear 2528 of the worm and worm gear assembly 1918, 1922. PTO Output provided by the bevel gear 2528 is shown similarly shaded to hatch 1612 to show the control. The Transgear assemblies 2010 and 2020 could also regulate protector ribs, not shown, as easily as hatch 1612 to provide a rib and hatch controlled constant rpm output of the water wheel shaft 1820.

Figure 26:
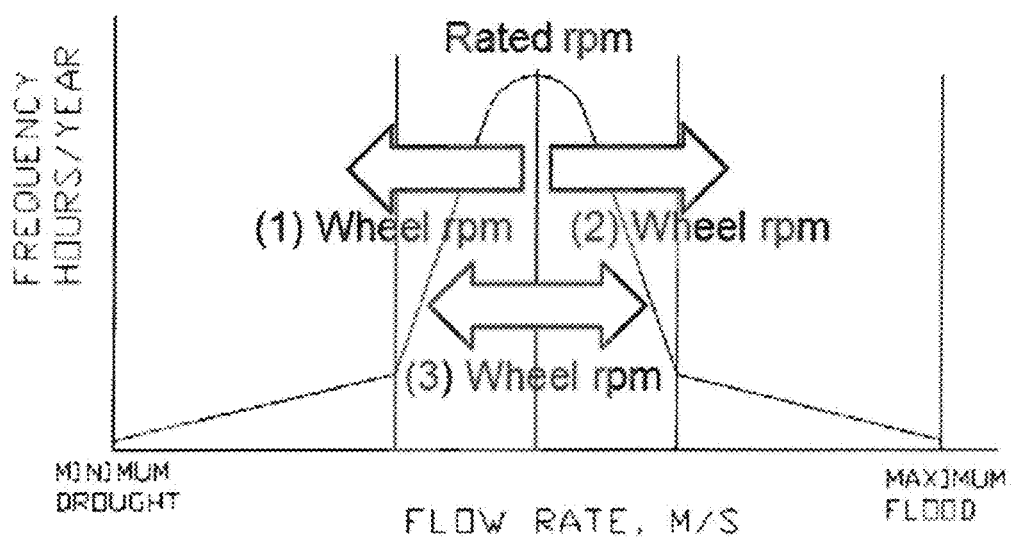
FIG. 26 provides a graph of rated rotational speed between minimum or draught conditions and a maximum or flood conditions of a river versus frequency or hours per year where, ideally, the rated speed is maintained within predetermined rotational speed limits for as long as possible during a year.

FIG. 26 represents a graph of rated speed of the waterwheel such that the waterwheel of an embodiment of the present invention should not go beyond rated speed or be allowed to decrease too low, if possible. The graph shows frequency in hours per year versus minimum or drought conditions (low or no water flow) to maximum or flood conditions at right. Ideally the flow rate should be maintained at rated speed between a reasonable range for as many hours of the year as possible. Wheel RPM (1) shown is always less than rated RPM and the maximum ribs and hatch control should be applied in combination with a variable to constant speed converter to increase speed to rated speed. Wheel RPM (2) shown is always faster than the rated rpm and points to maximum flood conditions, and it is essential that the hatch 1612 (and optionally protector ribs 1630) be controlled to allow water flow to bypass the water wheel (close the hatch down). Here, the wheel RPM is always greater than the rated RPM and must be decreased. Ideally, the rated speed and hours should reach the maximum rated speed per Wheel RPM (3).

FIG. 27A and FIG. 27B show rated speed graphs and embodiments FIG. 27C and FIG. 27D how an embodiment of the present invention utilizing a Transgear assembly may control the hatch 1612 to be within rated speed. FIG. 27A provides a graph showing wheel RPM being greater than rated speed. In this event, shaded areas are shown to indicate that the hatch 1612 is coupled by way of a sleeve surrounding the waterwheel shaft 1820 to hatch gear 2512 coupled to bevel gear 2528 via idle gear 2514 of a worm and a worm gear assembly 1918, 1922 for closing the hatch. As shown, the dark-shaded gear 2004 is held to decrease or to close the hatch 1612. In FIG. 27D, the reverse is true when rated speed points to the left. The hatch 1612 should be opened when the water flow or wheel RPM is less than the rated speed. In this event, the carrier discs 1708, 1709 of the Transgear assembly are shown in dark shading for hold to increase or to open the hatch 1612.

Referring now to rated speed graph FIG. 28A and mechanical diagram FIG. 28B, there is shown a further embodiment (cross-section of moving components) for making the water wheel RPM constant or fall within rated speed limits. Two Transgear assemblies 2010 and 2020 are shown, Transgear assembly 2010 is held to increase or open the hatch 1612 while sun gear extension disc 2004 is held to decrease or to close the hatch 1612 and maintain RPM within the rated speed of the double arrowed graph of FIG. 28A.

FIG. 29A through FIG. 29C show how a spur gear Transgear assembly may be used to accumulate two inputs into one output. DDMotion's basic spur gear Transgear assembly may have two independent inputs and an output. As shown in FIG. 29A, input #1 is carrier through a shaft 2905, input #2 is a top sun gear 2901 through a sleeve 2910, and the output is the bottom sun gear 2902 through a sleeve 2930. As shown in FIG. 29B, two inputs are carrier through a shaft 2930 and bottom sun gear 2902 through a sleeve 2910 and the output is top sun gear 2901 through a sleeve 2930. As shown in FIG. 29C, the two inputs are top sun gear 2901 through a sleeve 2905 and bottom sun gear 2902 through a sleeve 2910 and the output is the carrier through a shaft 2930. In these manners, two inputs may be accumulated and provide an accumulated output.

FIG. 30 shows (cross-section, not to scale) an embodiment 3000 and how pairs of Transgear assemblies 2210 and 2220, 2230 and 2240 may provide a rough tuning, for example, for hatch control and a fine tuning. The second Transgear assembly pair 2230, 2240 may provide the further fine tuning control for controlling already rough controlled rpm controlled by pair 2210 and 2220. A single shaft 1820 from water wheel 1608 passes through both rough and fine tuning and is accumulated at accumulator 3010 as an accumulated fine and rough tuned output provided by gear 3018. In FIG. 30, there is an accumulator 3010 having an accumulator extension gear 3002 reaching into accumulator 3010 including sleeve 3006 and a first sun gear 3012 or input #1. A center block 3014 is the other input, input #2 and the accumulated output is provided by gear 3018 coupled to sun gear #2 3016. FIG. 30 thus shows double tuning: rough tuning and fine tuning, for example, hatch control to provide a fine tuned constant rpm output to a gearbox and generator. Embodiment 3000 is separated by a wall into PTO #1 or hatch control (rough tuning) and PTO #2: hatch control fine tuning, both clockwise rotation by way of example. Note that the hold for PTO #1 counterclockwise points to sun gear extension disc 2004-1 and the hold for PTO #2 counterclockwise points to sun gear extension disc 2004-2. A further wall is penetrated by the same shaft 1820 as the pairs of Transgear assembly pairs 2210 and 2220, 2230 and 2240 to reach accumulator 3010.

FIG. 31 shows an embodiment (cross-section, not to scale) of a run-of-the-river turbine with a block, a hatch, and a waterwheel and that may be hatch controlled (rough tuning) and a fine tuning with a gearbox and a constant speed generator. Shaft 1820 of waterwheel 1608 passes through hatch control 2210 and 2220 and 2230 and 2240 comprising a first and second Transgear assembly pairs with bevel, worm, worm gear control of the hatch 1612 as discussed above. Thus, the shaft 1820 proceeds to fine tuning 2230 and 2240 for fine tuning the RPM of shaft 1820. Then, the shaft 1820 proceeds to accumulator 3010 for accumulating two inputs, the hatch controlled and finely tuned to be applied to the gearbox 3110. Meanwhile, the rotational output from the waterwheel shaft 1820 is transferred to the constant speed generator 3120 via the gearbox 3110 and from there to an electric power grid (or other power storage system) 3130. Different forms of feeding a water turbine with hatch control will now be discussed with reference to FIGS. 32(A) to 36.

Figure 32:
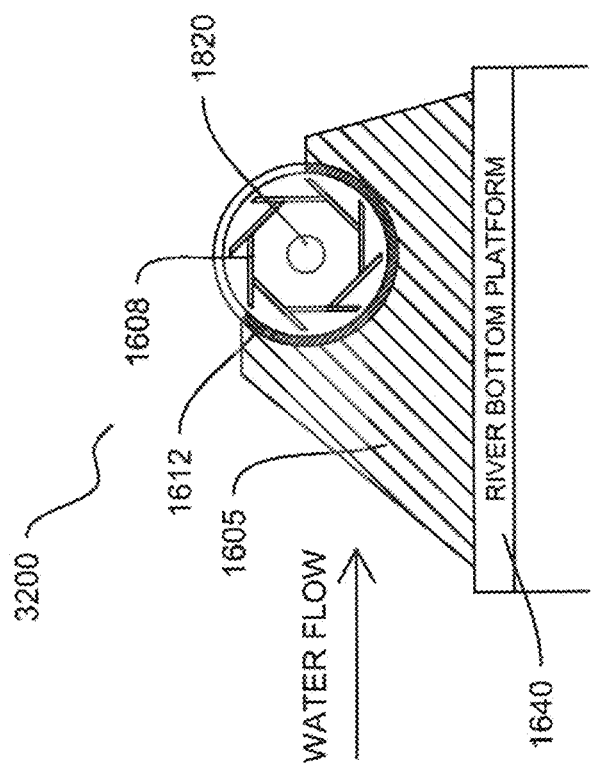
FIG. 32 shows a side view of a top-fed hatch-controlled run-of-the-river turbine of the present invention with the hatch totally open.

FIG. 32 shows a side view of a top-fed hatch-controlled run-of-the-river turbine 3200 of the present invention with the hatch totally open. As discussed above, the hatch 1612 may be partially open or totally closed depending on water flow and direction. As discussed previously, water flow in the direction shown may be accelerated by ribs (not shown) and slanted block 1605 to raise water from the river bottom to flow as in a penstock to turn the water wheel 1608. This embodiment is a top-fed turbine which may be mounted at the river bottom on a river bottom platform 1640.

Figure 33:
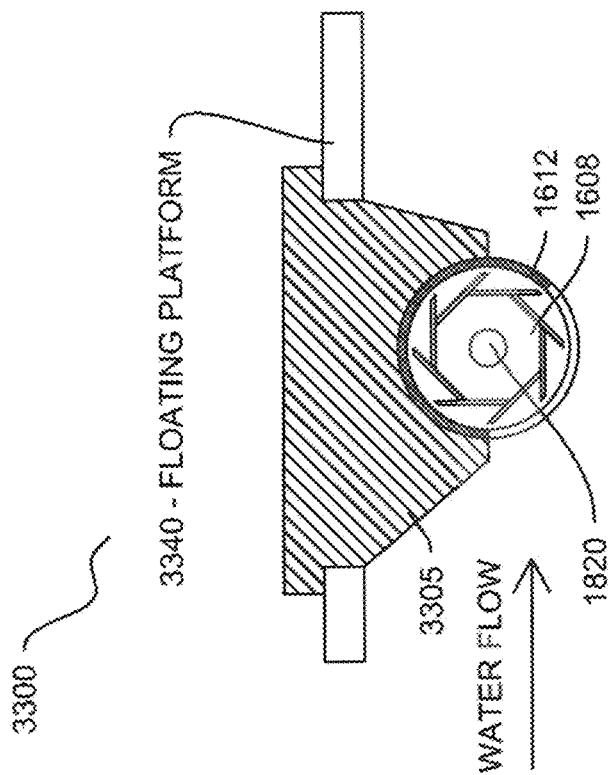
FIG. 33 shows a run-of-the-river turbine of the present invention that is bottom-fed or mounted to the bottom of a floating platform so that water flows downward over the block and into the waterwheel which has a hatch which is shown totally open in FIG. 33.

FIG. 33 shows a side view of a run-of-the-river turbine 3300 of the present invention that is bottom-fed or mounted to the bottom of a floating platform 3340 so that water flows downward under the block 3305 and into the waterwheel 1608 which has a hatch 1612. The gearbox and generator may preferably be on deck of the floating platform 3350 and preferably contained in a housing and maintained dry. On the other hand, per FIG. 37, Transgear assemblies may be housed about the shaft of the waterwheel 1608.

FIG. 34A and FIG. 34B comprise top views of first and second side-fed run-of-the-river turbines of the present invention mounted to a vertical wall 3410-1 per FIG. 34A that may be continuous. Alternatively, the vertical wall 3410-2 may be contoured per FIG. 34(B), for example, a bridge support piling. These may be already existing pilings that may be seen and avoided by river traffic. The principle of a side-fed turbine is the same. The block 3405-1, 3405-2, 3405-3 and 3405-4 should act as a penstock and increase the velocity of river water flowing to the waterwheels 1608-1, 1608-2, 1608-3 and 1608-4 which face into the water flow. In FIG. 34, the side-fed ROR turbines may be under or on a horizontal platform having a vertical wall constructed thereon. The vertical wall may be a wall of a canal or other wall running lengthwise along a flowing water stream or other source of water current such as an ocean bulkhead.

FIG. 35A and FIG. 35B comprise a top view of a side-fed run-of-the-river turbine mounted for rotational movement to a pole secured, for example, to a floating platform or to a river or ocean bed via a footing 3560 where the gear assemblies and generator may be located and whereby a tail wing 3550-1, 3550-2 may serve to point the side-fed run-of-the-river turbine into the direction of water flow as the ROR turbine may rotate to face the water flow. The hatch 1612 may be controlled independently as discussed above. A gearbox and generator may be either at the top or at the bottom (footing 3560). The flow media may be water (or air) but preferably water and may be tidal, the tides swinging the turbine all the way around to face either high tide or low tide flow.

FIG. 36A and FIG. 36B show exemplary embodiments for use, for example, in a tidal estuary where the tide may shift direction of river flow from toward the inland (high tide) to toward the ocean (low tide) wherein each of two turbines are oppositely aligned so that one or the other is actuated during either high or low tide. In FIG. 36A, water flow is to the right. Water flows up the ramp of the block of turbine 3605-1 to open hatch 1612 and actuates waterwheel 1608 to turn. On the other hand, the hatch 1612 of turbine 3605-2 is closed as determined by the direction of water flow. In FIG. 36B, the hatch 1612 of turbine 3605-3 is closed because of the direction of water flow from left to right while the hatch 1612 of turbine 3605-4 is open so that waterwheel 1608 may turn with the water flow velocity.

Figure 37B:
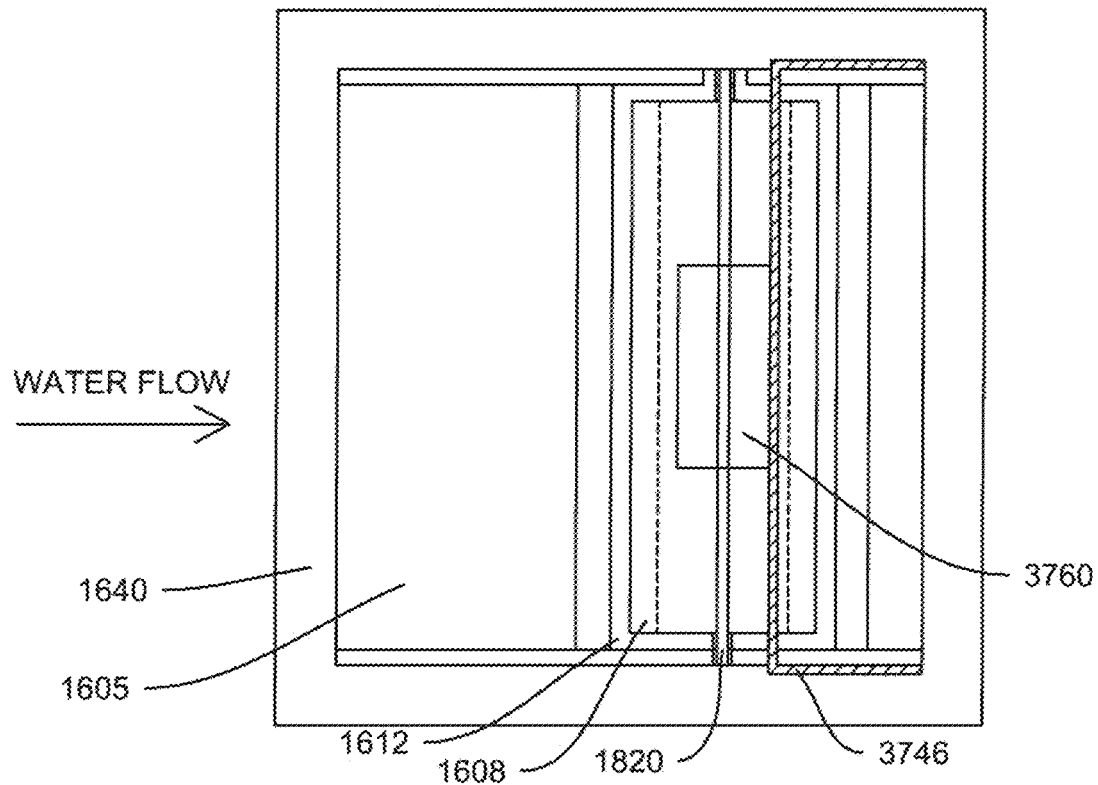
FIG. 37A and FIG. 37B respectively show a side view of a top-fed run-of-the-river turbine mounted on a platform and a corresponding cross-sectional top view showing the gear assemblies and an electricity generator being proximate to one another and contained within the waterwheel such that the gear assemblies may surround the waterwheel shaft.
Figure 37A:
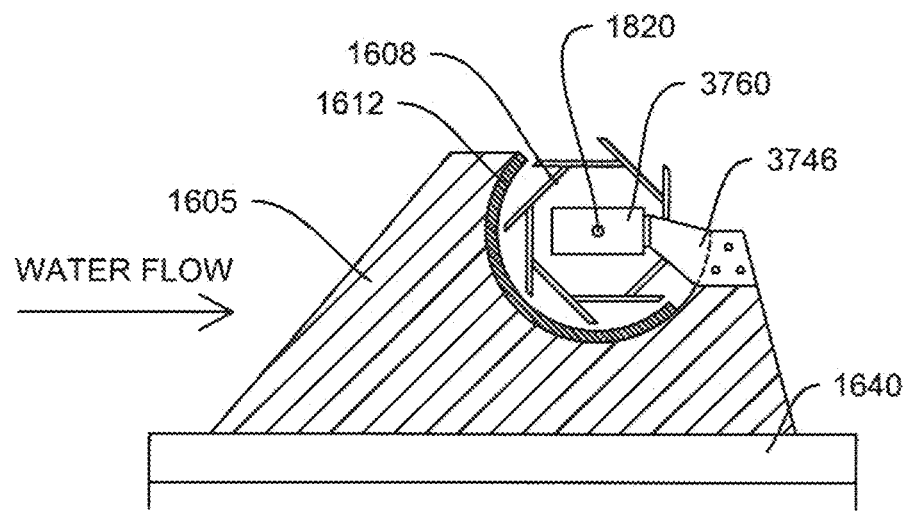

FIG. 37A and FIG. 37B are drawings which show that Transgear assemblies 3760 and generator 3120 will be fixed and not turning with the waterwheel shaft 1820 of waterwheel 1608. Generator 3120 may be mounted proximate to the Transgear assemblies which are run by the shaft 1820. It is not necessary for a Transgear assembly or a worm and worm gear assembly to be outside the confines of the waterwheel 1608 in many applications of the present invention. In fact, it may be preferred to provide as compact a turbine as possible. Per FIG. 37A, the water flows up block 1605 and platform 1640 to open hatch 1612 so that waterwheel 1612 may turn (rotate with the water flow). The internal shaft 1820 may be internal to gear assemblies 3760 and generator 3120 may likewise surround the shaft 1820. As seen in FIG. 37B, the generator 3120 and gear assemblies 3760 may be proximate one another and within the confines of the waterwheel 1608 and surround the shaft 1820 (and be driven by the shaft 1820).

The purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present invention in any way.

What I claim is:

1. A water turbine having a waterwheel and an output shaft of the waterwheel, the output shaft turned by the waterwheel at a rotational velocity determined by water flow and direction, the water turbine further comprising
- a hatch for covering the waterwheel proportionately with water flow to the waterwheel; and
- a housing containing a first spur gear Transgear assembly, the first spur gear Transgear assembly comprising a first sun gear connected to or integral with the output shaft of the waterwheel, the output shaft of the waterwheel entering and exiting the housing for the first spur gear Transgear assembly, the first spur gear Transgear assembly further comprising a second sun gear connected to or integral with a sleeve surrounding the output shaft of the waterwheel, the first spur gear Transgear assembly having a first hold control for clockwise rotational power-take-off output and a normally neutral power take-off output being the sleeve, the waterwheel output having the first spur gear Transgear assembly as a power-take off switch.

2. The water turbine of claim 1 further comprising
a worm and a worm gear assembly contained within the housing and coupled to a large diameter sun gear extension disc also connected to or integral with the sleeve of the Transgear assembly, the large diameter disc being coupled to the worm and worm gear assembly by a control gear.

3. The water turbine of claim 1 further comprising
a second spur gear Transgear assembly contained within the housing and connected to the first spur gear Transgear assembly by a large diameter sun gear extension disc connected to or integral with the sleeve of the first spur gear Transgear assembly, the first spur gear Transgear assembly having the first hold control for clockwise rotational power-take-off output, the second Transgear assembly having a second hold control for counterclockwise rotational power-take-off output, the waterwheel output having the first and second spur gear Transgear assemblies as the power-take off switch and the power take-off output comprising a shaft coupled to the first and second spur gear Transgear assemblies by a control gear.

4. The water turbine of claim 3 further comprising
a worm and worm gear assembly contained within the housing and coupled to the first and second spur gear Transgear assemblies, the worm and worm gear assembly comprising a power take-off output that is normally locked for controlling clockwise or counterclockwise rotational motion of the waterwheel.

5. The water turbine of claim 4 further comprising first and second housings,
- each housing having first and second spur gear Transgear assemblies making four spur gear Transgear assemblies and each housing having a worm and worm gear assembly,
- the output shaft of the water wheel having first, second, third and fourth sun gears connected to the output shaft of the water wheel, the waterwheel output having first and second outputs in each of clockwise and counterclockwise rotational directions.

6. The water turbine of claim 1 further comprising
a biasing means connected to the hatch for covering the waterwheel and the hatch having a lip, the water turbine having a slanted block for directing water flow toward the hatch lip, the rate of water flow tending to move the hatch lip and hatch countered by the biasing means connected to the hatch, the hatch when so moved covering at least a portion of the waterwheel during increased water flow above a predetermined amount as determined by a constant of the biasing means.

7. The water turbine of claim 6 wherein the biasing means comprises a spring having a spring constant.

8. The water turbine of claim 1 further comprising
a protector rib extending over the waterwheel to protect the waterwheel debris and to channel the water to the waterwheel.

9. The water turbine of claim 1 further comprising
first and second protector ribs at an input to the water turbine for channeling water over a slanted block to the waterwheel.

10. The water turbine of claim 1 further comprising
a sensor for detecting one of water flow rate, rotor revolutions per minute of a rotor of the water turbine, water flow direction and generator revolutions per minute of an electricity generator of the water turbine, a processor for comparing the one of water flow rate and revolutions per minute of one of the rotor and the generator with an associated predetermined value or determining a different water flow direction and actuating an actuator comprising one of a servo-motor or a hatch control for controlling the hatch closing during periods of water flow rate and revolutions per minute of the rotor or the generator exceeding the associated predetermined value or the water flow changing direction.

11. The water turbine of claim 1, the housing for the first spur gear Transgear assembly being contained within the waterwheel and surrounding the waterwheel output shaft.

12. The water turbine of claim 1 mounted under a floating platform.

13. The water turbine of claim 10 wherein the water turbine waterwheel receives water as a bottom-fed water turbine.

14. A water turbine having a waterwheel and an output shaft,
- the output shaft turned by the waterwheel at a rotational velocity determined by water flow and direction, the water turbine further comprising
- a hatch for covering the waterwheel proportionately with one of water flow amount and direction, the hatch being connected to or integral with a sleeve and connected to a control gear, the sleeve surrounding the output shaft of the waterwheel and entering a housing for the control gear within the housing,
- the housing for housing a first and a second Transgear assembly, each assembly having a sun gear connected to or integral with the output shaft of the waterwheel, the control gear operatively connected to a worm gear and worm for operating the first and second Transgear assemblies to control one of closing and opening the hatch depending on rotational velocity of the waterwheel output shaft.

15. The water turbine of claim 14,
- the opening and closing of the hatch being controlled between a minimum and a maximum rated speed, the first Transgear assembly having a large diameter control gear connected to or integral with the sleeve surrounding the output shaft of the waterwheel for control of the worm and worm gear assembly for closing the hatch and the first Transgear assembly also having a carrier gear and a pin for control by the worm and worm gear assembly for opening the hatch, the waterwheel rotational velocity being maintained between minimum and maximum rated rotational speeds.

16. A water turbine having a waterwheel and an output shaft, the output shall turned by the waterwheel at a rotational velocity determined by water flow and direction, the water turbine further comprising a spur gear Transgear assembly serving as an accumulator of first and second inputs and providing an output, the spur gear Transgear assembly having first and second sleeves surrounding the output shaft, the output shaft having a sun gear, the first and second sleeves coupled by first and second carrier gears and first and second pins for connecting the first and second carrier gears to the first and second sleeves.

17. The water turbine of claim 16, the output shaft being the first input, the first sleeve being the second input and the second sleeve comprising an accumulated output of the first and second inputs.

18. The water turbine of claim 16, the output shaft being the first input, the second sleeve being the second input and the first sleeve comprising an accumulated output of the first and second inputs.

19. The water turbine of claim 16, the first sleeve being the first input, the second sleeve being the second input and the output shaft comprising an accumulated output of the first and second inputs.

20. The water turbine of claim 16, the water turbine further comprising a constant speed generator and a gearbox connected between the constant speed generator and a further Transgear assembly for accumulating rough and fine tuning inputs to output a finely tuned, relatively constant rotational velocity to the electricity generator.

21. The water turbine of claim 1, further comprising the waterwheel covered in part by the hatch, the hatch having a control means for controlling the opening and closing of the hatch in proportion to one of water flow amount and water flow direction, the water turbine being mounted with a second water turbine to sides of a vertical wall, each turbine being a side fed water turbine.

22. The water turbine of claim 21, the first and second water turbines being mounted oppositely to one another to the vertical wall, the first water turbine for receiving water flow in one of two directions and the second water turbine for receiving water flow in the other of two directions.

23. The water turbine of claim 1, further comprising the waterwheel covered in part by the hatch, the hatch having a control means for controlling the opening and closing of the hatch in proportion to one of water flow amount and water flow direction, the water turbine waterwheel and hatch having a tail wing and being mounted to and rotatable around a pole, the waterwheel and hatch for control by the tail wing to receive water flow at the waterwheel according to direction of water flow, the waterwheel being capable of receiving water flowing from differing water direction around the pole.

24. The water turbine of claim 23 being fed water from one side of the waterwheel, the hatch mostly obstructing the other side of the waterwheel, the hatch for facing a direction of water flow.

\* \* \* \* \*